United States Patent
Dewing et al.

(10) Patent No.: US 9,930,712 B2
(45) Date of Patent: Mar. 27, 2018

(54) LIMITING FAILURE RATE BY SERVING THROUGH MULTIPLE CHANNELS

(75) Inventors: Shane Richard Dewing, San Diego, CA (US); Richard W. Lankford, San Diego, CA (US); Mark A. Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 13/472,307

(22) Filed: May 15, 2012

(65) Prior Publication Data

US 2013/0310055 A1 Nov. 21, 2013

(51) Int. Cl.
*H04W 76/02* (2009.01)
*H04W 84/04* (2009.01)
(Continued)

(52) U.S. Cl.
CPC ......... *H04W 76/025* (2013.01); *H04L 12/145* (2013.01); *H04L 65/4069* (2013.01);
(Continued)

(58) Field of Classification Search
CPC ..... H04W 28/00; H04W 28/18; H04W 28/24; H04W 88/00; H04W 88/06; H04W 24/04;
(Continued)

(56) References Cited

U.S. PATENT DOCUMENTS 6,269,149 B1   7/2001  Hassell et al.
6,356,622 B1 *  3/2002  Hassell .................. H04M 3/12
                                                                        379/1.01
(Continued)

FOREIGN PATENT DOCUMENTS

CN      1323479 A    11/2001
CN      1082297 C    4/2002
(Continued)

OTHER PUBLICATIONS

Cardoso, Roberto Speicys, et al. "Exploring Multi-path Communication in Hybrid Mobile Ad Hoc Networks"; 1st International Workshop on Ad-hoc Ambient Computing (AdhocAmC); Sophia Antipolis, France; 2008.
(Continued)

*Primary Examiner* — George Eng
*Assistant Examiner* — Hung Du
(74) *Attorney, Agent, or Firm* — Jae-Hee Choi; Muncy, Geissler, Olds & Lowe

(57) ABSTRACT

Systems, methods, and devices use a wireless device's capability to transmit and/or receive data over multiple communication pathways to improve data transmission quality. In the various embodiments, the same continuous data stream may be transmitted and/or received via different communication pathways. Different communication pathways may be established using different antennas of a wireless device, different wireless networks, different wireless communications protocols, and/or additional wireless devices. The continuous data stream may be transmitted and/or received via different communication pathways in a manner that enables the continuous data stream to be reconstructed from one or more of the different communication pathways. Additional communication pathways may be established based on user input indicating a voice call is high priority and/or approving the expenditure of additional resources.

90 Claims, 21 Drawing Sheets

(51) Int. Cl.
*H04M 7/00* (2006.01)
*H04L 29/06* (2006.01)
*H04L 12/14* (2006.01)
*H04W 88/06* (2009.01)
*H04B 7/02* (2017.01)
*H04B 7/022* (2017.01)

(52) U.S. Cl.
CPC ............ *H04M 7/0057* (2013.01); *H04B 7/022* (2013.01); *H04M 2207/18* (2013.01); *H04W 84/042* (2013.01); *H04W 88/06* (2013.01)

(58) Field of Classification Search
CPC ....... H04W 4/00; H04W 4/22; H04W 76/025; H04W 4/02; H04W 8/18; H04W 36/24; H04W 84/042; H04L 12/145; H04L 65/4069; H04M 7/0057; H04M 2207/18; H04M 88/06; H04M 84/043; H04M 3/12; H04B 7/022
USPC .............................................. 455/426.1, 437
See application file for complete search history.

(56) References Cited

U.S. PATENT DOCUMENTS

| | | | |
|---|---|---|---|
| 6,760,589 B1 | 7/2004 | Hobbis | |
| 7,343,160 B2 | 3/2008 | Morton | |
| 7,889,686 B1* | 2/2011 | Chang et al. | 370/310 |
| 8,587,630 B1* | 11/2013 | Krinsky | H04N 7/14 348/14.01 |
| 8,761,095 B1* | 6/2014 | O'Brien | 370/329 |
| 2003/0189900 A1* | 10/2003 | Barany et al. | 370/229 |
| 2006/0035640 A1 | 2/2006 | Karaoguz et al. | |
| 2006/0109825 A1* | 5/2006 | Abdel-Kader | H04W 4/02 370/338 |
| 2007/0077932 A1* | 4/2007 | Pi | H04W 88/06 455/445 |
| 2007/0183402 A1 | 8/2007 | Bennett et al. | |
| 2007/0263588 A1 | 11/2007 | Sathath et al. | |
| 2008/0207253 A1* | 8/2008 | Jaakkola et al. | 455/550.1 |
| 2009/0077254 A1* | 3/2009 | Darcie et al. | 709/231 |
| 2009/0143078 A1* | 6/2009 | Tu | H04W 8/18 455/456.3 |
| 2010/0272049 A1* | 10/2010 | Tung et al. | 370/329 |
| 2011/0177780 A1 | 7/2011 | Sato et al. | |
| 2011/0261678 A1* | 10/2011 | Sutter | H04M 7/0057 370/216 |
| 2011/0281544 A1* | 11/2011 | Pallota | H04M 1/72577 455/404.1 |
| 2011/0319072 A1* | 12/2011 | Ekici et al. | 455/426.1 |
| 2012/0129533 A1* | 5/2012 | Karaoguz et al. | 455/437 |
| 2013/0012246 A1* | 1/2013 | Gilson | 455/466 |
| 2013/0136102 A1* | 5/2013 | MacWan et al. | 370/331 |

FOREIGN PATENT DOCUMENTS

| | | | | |
|---|---|---|---|---|
| CN | 101257327 A | 9/2008 | | |
| EP | 1919136 A1 | 5/2008 | | |
| EP | 2131562 A1 * | 12/2009 | ........ | H04M 3/42187 |
| EP | 2194737 A1 | 6/2010 | | |
| JP | 2000078640 A | 3/2000 | | |
| JP | 2006345158 A | 12/2006 | | |
| JP | 2007300369 A | 11/2007 | | |
| JP | 2008060696 A | 3/2008 | | |
| JP | 2008118470 A | 5/2008 | | |
| JP | 2011146991 A | 7/2011 | | |
| WO | 9504420 A2 | 2/1995 | | |
| WO | 2004034715 A1 | 4/2004 | | |
| WO | 2008/088245 A1 | 7/2008 | | |
| WO | WO-2009041006 A1 | 4/2009 | | |

OTHER PUBLICATIONS

International Search Report and Written Opinion—PCT/US2013/040151—ISA/EPO—Dec. 3, 2013.

\* cited by examiner

US 9,930,712 B2

LIMITING FAILURE RATE BY SERVING THROUGH MULTIPLE CHANNELS

BACKGROUND

Cellular telephone communications, such as voice calls, involving at least one wireless device routinely fail because a wireless device enters a location lacking specific network coverage (i.e., a "dead zone") or high network congestion. Dropping a call, particularly an urgent call, can be frustrating and inconvenient for the parties to the phone call. The failure of a data communication session may be costly and inconvenient to wireless device users. Current wireless devices may enable data transmission over multiple communication pathways, but wireless devices lack a way to leverage simultaneous transmissions across multiple communication pathways to improve data transmission reliability.

SUMMARY

The systems, methods, and devices of the various embodiments use a wireless communication device's capability to transmit and receive data over multiple communication pathways to improve data transmission reliability. In the various embodiments, the same continuous data stream may be transmitted and/or received via different communication pathways. In the various embodiments, different communications pathways may be established using different antennas of a wireless device, different wireless networks, different wireless communications protocols, and/or additional wireless devices. In an embodiment, the continuous data stream may be transmitted and/or received via different communication pathways in a manner that enables the continuous data stream to be reconstructed from one or more of the different communication pathways. In an embodiment, additional communication pathways may be established based on user input indicating a voice call is high priority and/or approving the expenditure of additional resources. In an embodiment, the continuous data stream may be transmitted and/or received as a series of indexed packets.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
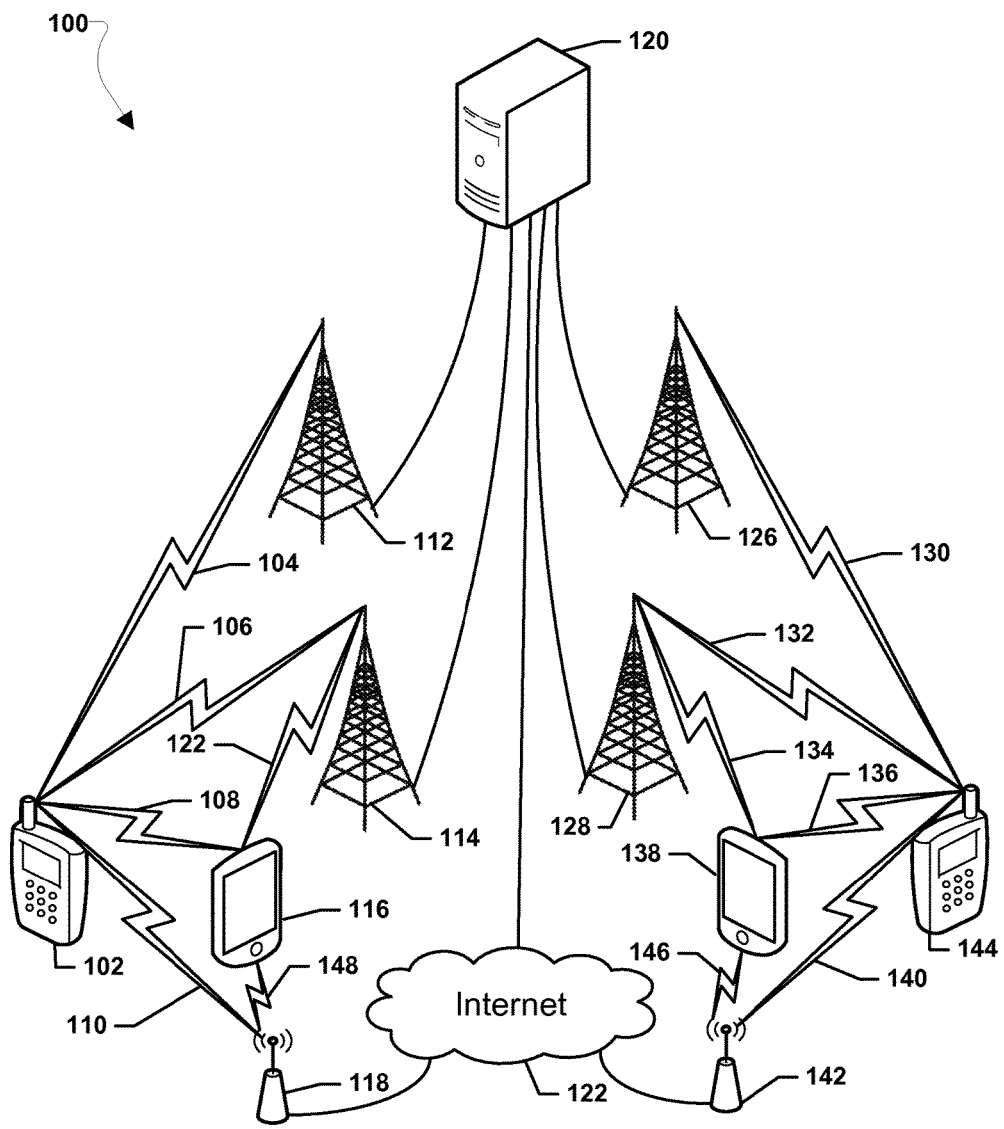
FIG. 1 is a communication system block diagram of a wireless communication system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "wireless device" is used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

The various embodiments use a wireless device's capability to transmit and/or receive data over multiple communication pathways to improve data transmission quality. In the various embodiments, the same continuous data stream may be transmitted and/or received via different communication pathways. In the various embodiments, different communications pathways may be established using different antennas of a wireless device, different wireless networks, different wireless communications protocols, and/or additional wireless devices. In an embodiment, the continuous data stream may be transmitted and/or received via different communication pathways in a manner that enables the continuous data stream to be reconstructed from one or more of the different communication pathways. In an embodiment, additional communication pathways may be established based on user input indicating a voice call is high priority and/or approving the expenditure of additional resources. In an embodiment, the continuous data stream may be transmitted and/or received as a series of indexed packets.

The various embodiments leverage the ability of modern wireless devices to establish multiple communication pathways to maintain call quality in a wireless communication system. By establishing redundant communication pathways between devices in a wireless communication system connection reliability may be increased and the user experience may be enhanced. In an embodiment, a first and a second communication pathway may be established between two wireless devices in a wireless communication system. In another embodiment, the same data may be transmitted on both the first and second communication pathway, and packet indexes may be used to recover a more complete set of transmitted data packets. In another embodiment, the second communication pathway may be established in response to a trigger event, such as a user indication of a high priority call or an prediction that a wireless device may enter a low call quality zone (i.e., dead zone). In a further embodiment, one mobile device may send a dual communication pathway request from the server to the second wireless device requesting the second wireless device to establish a dual communication pathway with the server, and the second wireless device may receive the request to establish a dual communication pathway, which may be accepted or rejected by a user based on user input, call pricing, power usage, battery level, or call priority.

In the various embodiments wireless devices that are in a wireless communication system may be enabled to establish multiple communication pathways. As an example, a wireless device may have two antennas, one antenna for use in a 3G cellular network and a second antenna for use in a 4G cellular network. As an additional example, a wireless device may have the ability to communicate over two channels at the same time on one antenna.

In an embodiment, a wireless device may utilize two antennas and two wireless communication protocols to avoid a dead zone, or limited coverage area. At an initial time, the wireless device may be placing a call on a 3G network and traveling in a given direction. As the wireless device proceeds in a given direction, a normal handoff between two 3G cellular towers may occur. Later, the wireless device may predict that the wireless device is approaching or will soon enter a wireless dead zone. This prediction of entering a low-quality cell zone may be based on the location, orientation, and velocity of the wireless device, which may be compared to a database of low-quality reception zones. The location of wireless dead zones may be established based on past user history and/or database records of the network. The wireless device may use its 4G antenna to establish a separate and redundant call over an available 4G network. The separate call over the 4G network may transfer the same information as the original 3G call. The wireless device may enter the 3G dead zone and the 3G call may be dropped. However, because the 4G call is also streaming the data from the wireless device, the end users may never realize that the 3G call was dropped because the call was maintained on the 4G network. The 3G dead zone may be exited and the 3G call may be reestablished while the 4G call is still active. A location query, such as a GPS query, may indicate there are no further dead zones on the route being traveled and the wireless device may end the 4G call. In this manner, though the wireless device passed through a 3G dead zone, no service interruption may be experienced by the end user of the wireless device.

In an embodiment, a first wireless device may establish two communication pathways with a second device, such as a server. As an example, the first communication pathway may be a 3G connection and the second communication pathway may be an LTE connection. The two communication pathways may be established in response to a prediction by either wireless device (or a server involved in the communication) that the first wireless device may enter a network dead zone and/or may be established because a user of the first wireless device indicated a call is of high priority. The first wireless device may transmit the same data to the second device via both communication pathways. In an embodiment, the data transmitted may be a series of indexed packets. The second device may receive the two copies of the transmitted data and may discard redundant data portions. Missing data portions from one data set may be filled with data from the other data set to form a combined data set. In an embodiment, the second device may establish a third communication pathway with a second wireless device, and may transmit the combined data set to the second wireless device. In an alternative embodiment, both data streams may be forwarded by the second device as received for recombination at the second wireless device.

In an embodiment, the first wireless device may establish a link with another wireless device associated with the user of the first wireless device. As an example, the connection may be a Blue Tooth® connection. The linked wireless device may use the same type of connection as the first wireless device, such as a 3G connection. The first wireless device may direct the linked wireless device to establish the second communication pathway with the second device, and the first wireless device may transmit the same data sent via the first communication pathway to the linked wireless device. The linked wireless device may then forward on the data via the second communication pathway to the second device.

In a further embodiment, a user's wireless device may receive a dual communication pathway request from another device, such as a communication system server. The dual communication pathway request may be accepted or rejected. If the dual communication pathway request is accepted, dual communication pathways may be established between the user's wireless device and another device in the communication system. The same data may then be transmitted on the established dual communication pathways. In an embodiment, the determination to accept or reject the dual communication pathway request may be based on one or more of a user input, call pricing (cost to establish the dual communication pathways), power usage, device battery level, and call priority.

In the various embodiments, audio capture may include receiving audio inputs via a microphone of the wireless device and preparing the audio inputs for transmission as well as converting received data to audio outputs via a speaker of the wireless device. In the various embodiments, calls may include continuous streams of audio data exchanged between wireless devices and/or servers. While example embodiments are discussed in terms of operations performed to transmit and receive streams of data during audio calls (i.e., voice calls), the various embodiment methods may also be implemented to transmit and receive video calls (i.e., audio and video calls or video only calls). While example embodiments are discussed in terms of operations to establish two (i.e., dual) communication pathways, additional communication pathways, such as three, four, or more communication pathways, may be established between the various devices to provide for transmitting/receiving two or more redundant continuous streams of data.

FIG. 1 illustrates a wireless communication system 100 suitable for use with the various embodiments. The wireless communication system 100 may include a wireless device 102 in communication with a server 120 via wireless networks 112, 114, 118. The wireless device 102 may be configured to establish a wireless connection 104 to communicate with a cellular data network 112 (e.g., CDMA, TDMA, GSM, PCS, 3G, 4G, LTE, or any other type of cellular data network) that may be in communication with the server 120. In this manner, a wireless communication pathway between the wireless device 102 and the server 120 may be established and data (e.g., voice calls, text messages, sensor data streams, e-mails, etc) may be exchanged between the wireless device 102 and the server 120. Additionally, the wireless device 102 may be configured to establish a wireless connection 106 with a cellular data network 114 (e.g., CDMA, TDMA, GSM, PCS, 3G, 4G, LTE, or any other type of cellular data network different from cellular data network 112) that may be in communication with the server 120. In this manner, a wireless communication pathway between the wireless device 102 and the server 120 may be established and data (e.g., voice calls, text messages, sensor data streams, e-mails, etc) may be exchanged between the wireless device 102 and the server 120. The wireless device 102 may be configured to establish a wireless connection 110, such as a Wi-Fi connection established with a wireless access point 118, such as a Wi-Fi access point. The wireless access point 118 may connect to the Internet 122, and the server 120 may be connected to the Internet 122. In this manner, a wireless communication pathway between the wireless device 102 and the server 120 may be established and data (e.g., voice calls, text messages, sensor data streams, e-mails, etc) may be exchanged between the wireless device 102 and the server 120.

The wireless device 102 may also be in communication with an additional wireless device 116 via a local connection 108, such as a Blue Tooth® connection. The additional wireless device 138 may be configured to establish a wireless connection 122 with the cellular data network 114 and/or a wireless connection 148, such as a Wi-Fi connection, with the wireless access point 118. In this manner, a wireless communication pathway between the wireless device 102 and the server 120 may be established across the additional wireless device 116 and data (e.g., voice calls, text messages, sensor data streams, e-mails, etc) may be exchanged between the wireless device 102 and the server 120 across the additional wireless device 116.

The wireless communication system 100 may include a wireless device 144 in communication with the server 120 via wireless networks 126, 128, 142. The wireless device 102 may be configured to establish a wireless connection 130 to communicate with a cellular data network 126 (e.g., CDMA, TDMA, GSM, PCS, 3G, 4G, LTE, or any other type of cellular data network) that may be in communication with the server 120. In this manner, a wireless communication pathway between the wireless device 144 and the server 120 may be established and data (e.g., voice calls, text messages, sensor data streams, e-mails, etc) may be exchanged between the wireless device 144 and the server 120. Additionally, the wireless device 144 may be configured to establish a wireless connection 132 with a cellular data network 128 (e.g., CDMA, TDMA, GSM, PCS, 3G, 4G, LTE, or any other type of cellular data network different from cellular data network 126) that may be in communication with the server 120. In this manner, a wireless communication pathway between the wireless device 144 and the server 120 may be established and data (e.g., voice calls, text messages, sensor data streams, e-mails, etc) may be exchanged between the wireless device 144 and the server 120. The wireless device 144 may be configured to establish a wireless connection 140, such as a Wi-Fi connection established with a wireless access point 142, such as a Wi-Fi access point. The wireless access point 142 may connect to the Internet 122, and the server 120 may be connected to the Internet 122. In this manner, a wireless communication pathway between the wireless device 144 and the server 120 may be established and data (e.g., voice calls, text messages, sensor data streams, e-mails, etc) may be exchanged between the wireless device 144 and the server 120.

The wireless device 144 may also be in communication with an additional wireless device 138 via a local connection 136, such as a Bluetooth® connection. The additional wireless device 138 may be configured to establish a wireless connection 134 with the cellular data network 114 and/or a wireless connection 146, such as a Wi-Fi connection, with the wireless access point 142. In this manner, a wireless communication pathway between the wireless device 144 and the server 120 may be established across the additional wireless device 138 and data (e.g., voice calls, text messages, sensor data streams, e-mails, etc) may be exchanged between the wireless device 144 and the server 120 across the additional wireless device 138.

In an alternative embodiment, wireless networks 112 and 126 may be a single wireless network, wireless networks 114 and 128 may be a single wireless network, and/or wireless networks 118 and 142 may be a single wireless network.

Figure 2:
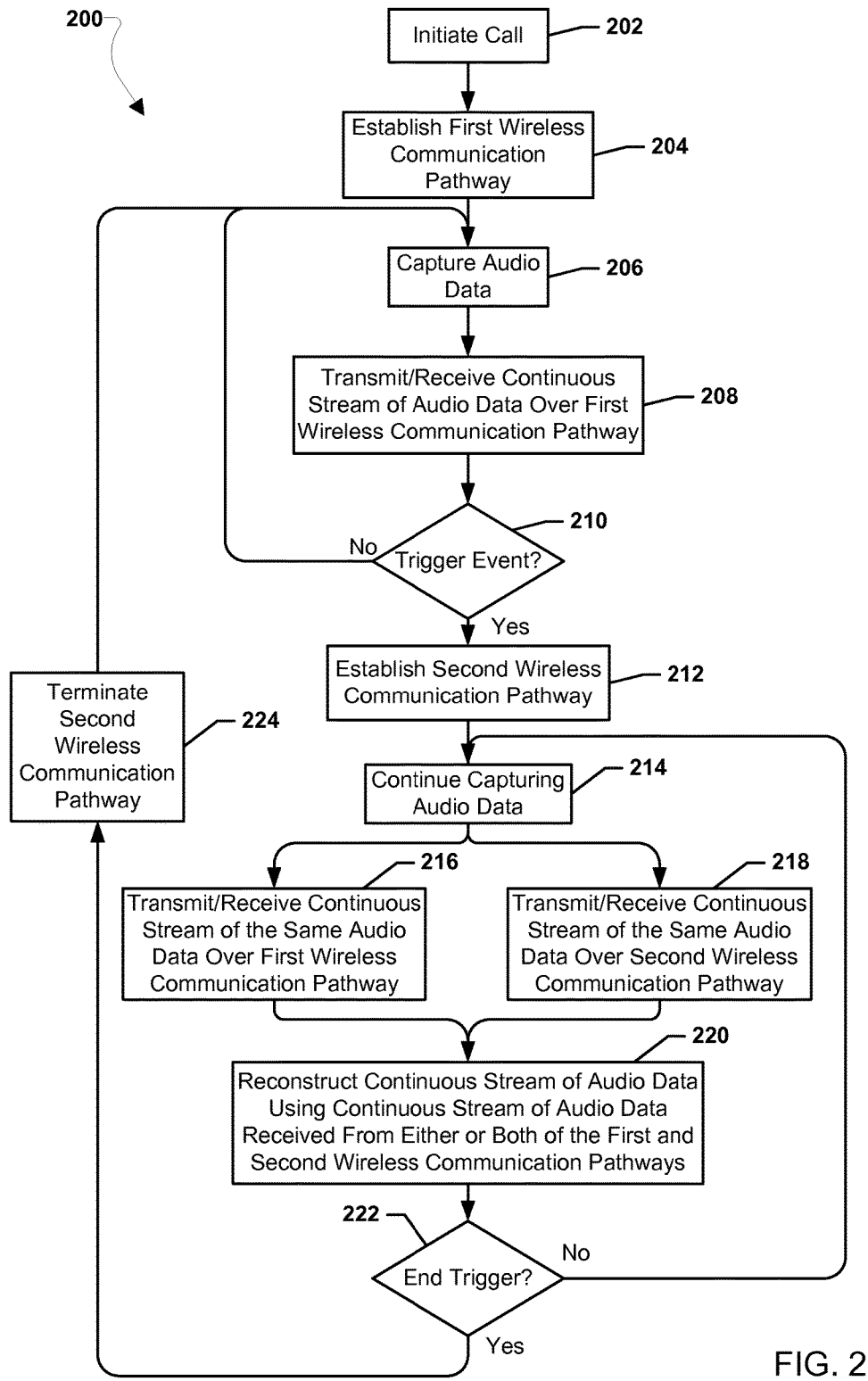
FIG. 2 is a process flow diagram illustrating an embodiment method for transmitting/receiving dual pathway communications at a wireless device.

FIG. 2 illustrates an embodiment method 200 for transmitting/receiving dual pathway communications at a wireless device. In an embodiment, the operations of method 200 may be implemented by the processor of a wireless device. In block 202 the wireless device processor may initiate a call. As an example, a call may be initiated by a wireless device user dialing a destination phone number. In block 204 the wireless device processor may establish a first wireless communication pathway. In an embodiment, a wireless communication pathway may be established between the wireless device and a server. As an example, the wireless communication pathway may be established between the wireless device and the server over a 3G wireless network.

In an alternative embodiment, a wireless communication pathway may be established between the wireless device and a second wireless device. In block 206 the wireless device processor may capture audio data. In an embodiment, capturing audio data may include receiving audio input from a microphone of the wireless device and preparing the audio data for transmission, as well as converting received data to audio output and sending the audio output to a speaker of the wireless device for output to a user. In block 208 the wireless device processor may transmit/receive a continuous stream of audio data over the first wireless communication pathway. In an embodiment, the continuous stream of audio data may be the phone conversation occurring between two or more users.

In determination block 210, the wireless device processor may determine whether a trigger event has occurred. A trigger event may be an event associated with establishing dual pathway communications. In an embodiment, a trigger event may be a prediction that the wireless device may soon enter or is approaching a limited cellular coverage area or low call quality zone (i.e., dead zone). As an example, the wireless device processor may be configured with a dual pathway communication client application to leverage location and velocity vector information received from various sensors, such as GPS sensors and accelerometers, to determine a likely path of travel for the wireless device. The wireless device processor may compare the likely path of travel to a cellular coverage map to predict whether the wireless device will enter or is approaching a limited cellular coverage area, or dead zone, and the prediction that the wireless device is approaching a limited cellular coverage area, or dead zone may be a trigger event. In a similar embodiment, a user of the wireless device may have previously designated a specific area as a poor quality area. A prediction based on the likely path of travel that the wireless device is approaching the poor quality area may be a trigger event. In an embodiment, a trigger event may be a user indication that a call is a high priority call, such as a button push and/or high priority call icon selection. In an embodiment, a trigger event may be a backward looking detection of bad call quality. As an example, the wireless device processor may monitor call quality and determine whether call quality has fallen below a threshold value. The determination that the call quality is below the threshold may be a trigger event. In a further embodiment, trigger events may be based on user and/or device settings, such as caller IDs, call quality information, time of day, day of the week, cost determinations (e.g., data pricing information), power usage, device battery level information, data usage, call type information (e.g., direct dialed call, transferred call, conference call), etc. In an embodiment, trigger events may be user created and/or modifiable. In an embodiment, more than one trigger event may be stored in a memory of the wireless device, such as in a lookup table. In this manner, trigger events may be associated with multiple different criteria.

If a trigger event has not occurred (i.e., determination block 210="No"), in block 206 the wireless device processor may continue to capture audio data and in block 208 the wireless device processor may continue to transmit/receive the continuous stream of audio data over the first wireless communication pathway.

If a trigger event does occur (i.e., determination block 210="Yes"), in block 212 the wireless device processor may establish a second wireless communication pathway. In an embodiment, the second wireless communication pathway may be a wireless communication pathway different from the first wireless communication pathway. In an embodiment, the wireless device processor may be configured to establish more than one call at a time, and second wireless communication pathway may be established as a second call between the wireless device and another device (i.e., server and/or a second wireless device). As an example, if the first wireless communication pathway is a 3G call, the second wireless communication pathway may be a separate 3G call. In an embodiment, the wireless device processor may be configured to establish the first and second wireless communication pathways using the same and/or different antennas. In an embodiment, the wireless device processor may be configured to establish the first and second wireless communication pathways using different wireless protocols. As an example, the first wireless communication pathway may be established using the Voice Over Internet Protocol and the second wireless communication pathway may be established using the Real-Time Transport Protocol. In an embodiment, the first and second wireless communication pathways may be established over entirely different wireless networks. As an example, the first wireless communication pathway may be established over a 3G network, and the second wireless communication pathway may be established over a Wi-Fi network. As another example, the first wireless communication pathway may be established over a 3G network, and the second wireless communication pathway may be established over an LTE network.

In block 214 the wireless device processor may continue capturing audio data in the manner discussed above with reference to block 206. In parallel, in blocks 216 and 218, respectively, the wireless device processor may transmit/receive the continuous stream of the same audio data over the first wireless communication pathway and transmit/receive the continuous stream of the same audio data over the second wireless communication pathway. In this manner, the same audio data may be transmitted and/or received over two wireless communication pathways. As discussed above, the first and second wireless communication pathways may be different (e.g., different protocols, different networks, different antennas, etc). However, the audio data itself transmitted and/or received via the first and second wireless may be the same. As an example, in a voice call the captured audio data may be the voice call, and the same voice call may be transmitted/received over both the first and second wireless communication pathway. In this manner, the transmission of the same data set over dual communication pathways may increase call reliability/quality because the chance for lost data may be reduced.

In block 220 the wireless device processor may reconstruct the continuous stream of audio data using the continuous streams of audio data received from either or both of the first and second communication pathways. In an embodiment, two audio data streams may be received over the two wireless communications pathways. The two audio data streams may have been generated from the same original audio data stream. However, due to transmission interference, loss of signal, equipment failures, and/or other errors, the complete original audio data stream may not be received over both the first and second wireless communication pathways. The wireless device processor may use portions of the original audio data stream received over either or both of the first and second communication pathways to reconstruct the original audio data stream. In this manner, though one or both of the wireless communication pathways may not achieve complete transmission of the original audio data stream, the wireless device processor may be able to reconstruct the original audio data stream with the portions actually received. In an embodiment, reconstructing the continuous stream of audio data using the continuous streams of audio data received from either or both of the first and second communication pathways may include comparing the two continuous streams of audio data to determine missing segments in one continuous stream of audio data. Based on the missing portions, the portions to be filed from the other continuous stream of audio data may be determined and/or repeat segments may be discarded.

In determination block 222, the wireless device processor may determine whether an end trigger has occurred. An end trigger may be an event associated with terminating dual pathway communications. In an embodiment, an end trigger may be an indication that the wireless device has exited a limited cellular coverage area, or dead zone. As an example, the wireless device processor may be configured with a dual pathway communication client application to leverage location information received from various sensors, such as GPS sensors. The wireless device processor may compare the wireless device's current location to a cellular coverage map to determine whether the wireless device is outside a limited cellular coverage area, or dead zone, and the determination the wireless device is outside a limited cellular coverage area, or dead zone, may be an end trigger. In an embodiment, an end trigger may be a user indication to stop dual pathway communications, such as a button push and/or high priority call de-selection. In a further embodiment, end triggers may be based on user and/or device settings, such as caller IDs, call quality information, time of day, day of the week, cost determinations (e.g., data pricing information), power usage, device battery level information, data usage, call type (e.g., direct dialed call, transferred call, conference call), etc. In an embodiment, end triggers may be user created and/or modifiable. In an embodiment, more than one end trigger may be stored in a memory of the wireless device, such as in a lookup table. In this manner, end triggers may be associated with multiple different criteria.

If no end trigger occurs (i.e., determination block 222="No"), in block 214 the wireless device processor may continue to capture audio data, in blocks 216 and 218 the wireless device processor may continue to transmit/receive the continuous stream of the same audio data over the first and second wireless communication pathways, and in block 220 the wireless device processor may continue to reconstruct the continuous stream of audio data using the continuous streams of audio data received from either or both of the first and second communication pathways.

If an end trigger does occur (i.e., determination block 222="Yes"), in block 224 the wireless device processor may terminate the second wireless communication pathway. In an embodiment, the wireless device processor may terminate the connections necessary to maintain the second wireless communication pathway and may stop transmitting/receiving via the second wireless communication pathway. In this manner, the second wireless communication pathway may be established for only a portion of the time that the first wireless communication pathway is established. In an alternative embodiment, rather than terminating the second wireless communication pathway, the first wireless communication may be terminated and the second wireless communication pathway may be substituted for the first wireless communication pathway. In block 206 the wireless device processor may capture audio data, and in block 208 may transmit/receive the continuous stream of audio data over the first wireless communication pathway.

Figure 3:
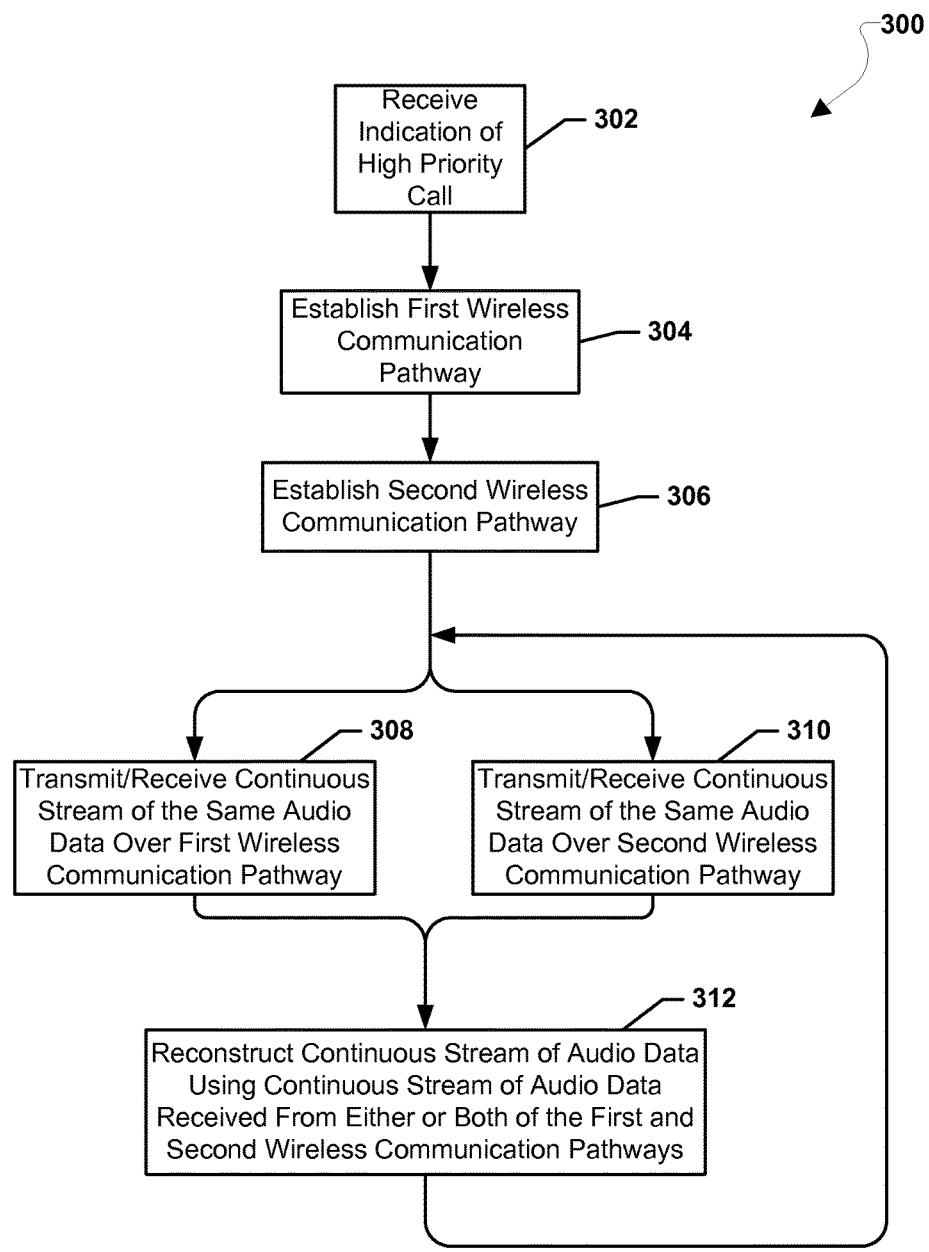
FIG. 3 is a process flow diagram illustrating an embodiment method for transmitting/receiving dual pathway communications at a wireless device and/or server.

FIG. 3 illustrates an embodiment method 300 for transmitting/receiving dual pathway communications. In an embodiment, the operations of method 300 may be implemented by the processor of a wireless device. In another embodiment, the operations of method 300 may be performed by a processor of a server. In block 302 the server/wireless device processor may receive an indication of a high priority call. In an embodiment, the indication of a high priority call may be information included in the information sent from an initiating device to establish a call and/or wireless communication pathway, such as header information of a call request. In another embodiment, an indication of a high priority call may be an additional message received by server/wireless device processor from the initiating device. In an embodiment, an indication of a high priority call may be received after a call is already established over a first wireless communication pathway.

In block 304 the server/wireless device processor may establish a first wireless communication pathway. In an embodiment, a wireless communication pathway may be established between the server/wireless device and an initiating wireless device. As an example, the wireless communication pathway may be established between the server/wireless device and the initiating wireless device over a 3G wireless network.

In block 306 the server/wireless device processor may establish a second wireless communication pathway. In an embodiment, the second wireless communication pathway may be a wireless communication pathway different from the first wireless communication pathway. In an embodiment, the server/wireless device processor may be configured to establish more than one call at a time, and second wireless communication pathway may be established as a second call between the initiating wireless device and the server/wireless device. As an example, if the first wireless communication pathway is a 3G call, the second wireless communication pathway may be a separate 3G call. In an embodiment, the server/wireless device processor may be configured to establish the first and second wireless communication pathways using different wireless protocols. As an example, the first wireless communication pathway may be established using the Voice Over Internet Protocol and the second wireless communication pathway may be established using the Real-Time Transport Protocol. In an embodiment, the first and second wireless communication pathways may be established over entirely different wireless networks. As an example, the first wireless communication pathway may be established over a 3G network, and the second wireless communication pathway may be established over a Wi-Fi network. As another example, the first wireless communication pathway may be established over a 3G network, and the second wireless communication pathway may be established over an LTE network.

In parallel, in blocks 308 and 310, respectively, the server/wireless device processor may transmit/receive the continuous stream of the same audio data over the first wireless communication pathway and transmit/receive the continuous stream of the same audio data over the second wireless communication pathway. In this manner, the same audio data may be transmitted and/or received over two wireless communication pathways. As discussed above, the first and second wireless communication pathways may be different (e.g., different protocols, different networks, different antennas, etc). However, the audio data itself transmitted and/or received via the first and second wireless may be the same. As an example, the same voice call may be transmitted/received over both the first and second wireless communication pathway. In this manner, the transmission of the same data set over dual communication pathways may increase call reliability/quality because the chance for lost data may be reduced.

In block 312 the server/wireless device processor may reconstruct the continuous stream of audio data using the continuous streams of audio data received from either or both of the first and second communication pathways. In an embodiment, two audio data streams may be received over the two wireless communications pathways. The two audio data streams may have been generated from the same original audio data stream. However, due to transmission interference, loss of signal, equipment failures, and/or other errors, the complete original audio data stream may not be received over both the first and second wireless communication pathways. The server/wireless device processor may use portions of the original audio data stream received over either or both of the first and second communication pathways to reconstruct the original audio data stream. In this manner, though one or both of the wireless communication pathways may not achieve complete transmission of the original audio data stream, the server/wireless device processor may be able to reconstruct the original audio data stream with the portions actually received. In an embodiment, reconstructing the continuous stream of audio data using the continuous streams of audio data received from either or both of the first and second communication pathways may include comparing the two continuous streams of audio data to determine missing segments in one continuous stream of audio data. Based on the missing portions, the portions to be filed from the other continuous stream of audio data may be determined and/or repeat segments may be discarded. The method 300 may return to blocks 308 and 310 and continue to transmit/receive using the first and second wireless communication pathways. In this manner, the server/wireless device processor may continually transmit/receive the same audio data using dual communication pathways.

Figure 4:
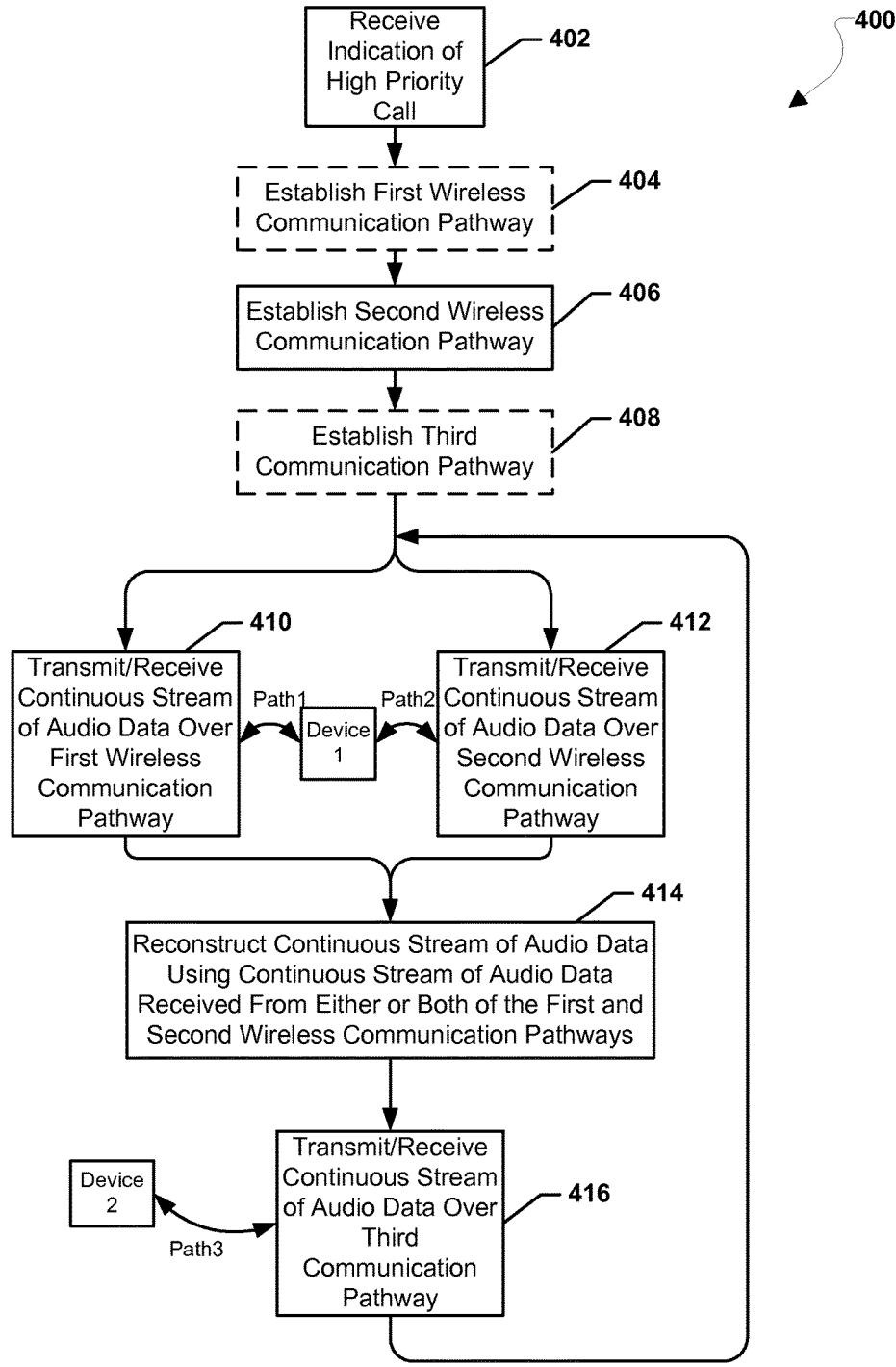
FIG. 4 is a process flow diagram illustrating an embodiment method for managing the transmission/reception of data between two communications devices over different wireless communications pathways.

FIG. 4 illustrates an embodiment method 400 for managing the transmission/reception of data between two communication devices over multiple different communication pathways. In an embodiment, the operations of method 400 may be implemented by the processor of a server. In an embodiment, the server processor may receive an indication of a high priority call. In an embodiment, the indication of a high priority call may be information included in the information sent from an initiating device to establish a call and/or wireless communication pathway, such as header information of a call request. In another embodiment, an indication of a high priority call may be an additional message received by server processor from the initiating device. In optional block 404, the server processor may establish the first wireless communication pathway. As an example, the first wireless communication pathway may be established between the server and the initiating wireless device (i.e., first device) over a 3G wireless network. Block 404 may be optional, because in an embodiment, an indication of a high priority call may be received after a call is already established over the first wireless communication pathway.

In block 406 the server processor may establish a second wireless communication pathway. In an embodiment, the second wireless communication pathway may be a wireless communication pathway different from the first wireless communication pathway. As an example, if the first wireless communication pathway is a 3G call, the second wireless communication pathway may be a separate 3G call. In an embodiment, the server processor may be configured to establish the first and second wireless communication pathways using different wireless protocols. As an example, the first wireless communication pathway may be established using the Voice Over Internet Protocol and the second wireless communication pathway may be established using the Real-Time Transport Protocol. In an embodiment, the first and second wireless communication pathways may be established over entirely different wireless networks. As an example, the first wireless communication pathway may be established over a 3G network, and the second wireless communication pathway may be established over a Wi-Fi network. As another example, the first wireless communication pathway may be established over a 3G network, and the second wireless communication pathway may be established over an LTE network. In this manner, no matter the network and/or protocol used, the first and second wireless communication pathways may establish two separate communication pathways between the server and the initiating wireless device (i.e., first wireless device).

In optional block 408, the server processor may establish a third communication pathway. In an embodiment, the third communication pathway may be a communication pathway established between the server and the destination device (i.e., second device), such as the wired/wireless device originally dialed by the initiating wireless device (i.e., first device). As an example, the third communication pathway may be established between the server and the destination device (i.e., second device) over a 3G wireless network and/or a public switched telephone network. In an embodiment, the communication pathway may be of the same type (e.g., network, protocol, etc) as the first and/or second wireless communication pathway. In another embodiment, the third communication pathway may be of a different type (e.g., network, protocol, etc) than the first and/or second wireless communication pathway. Block 408 may be optional, because in an embodiment, an indication of a high priority call may be received after a call is already established between the initiating device (i.e., first device), the server, and the destination device (i.e., second device), and data is already being exchanged between the server and the destination device (i.e., second device).

In parallel, in blocks 410, 412, and 416 respectively, the server processor may transmit/receive the continuous stream of the same audio data over the first wireless communication pathway, transmit/receive the continuous stream of the same audio data over the second wireless communication pathway, and transmit/receive the continuous stream of the same audio data over the third communication pathway. In this manner, the same audio data may be transmitted and/or received over two wireless communication pathways with the first device. As discussed above, the first and second wireless communication pathways may be different (e.g., different protocols, different networks, different antennas, etc). However, the audio data itself transmitted and/or received via the first and second wireless may be the same. As an example, the same voice call may be transmitted/received over both the first and second wireless communication pathway. In this manner, the transmission of the same data set over dual communication pathways may increase call reliability/quality because the chance for lost data may be reduced.

In block 414 the server processor may reconstruct the continuous stream of audio data using the continuous streams of audio data received from either or both of the first and second communication pathways. In an embodiment, two audio data streams may be received over the two wireless communications pathways. The two audio data streams may have been generated from the same original audio data stream. However, due to transmission interference, loss of signal, equipment failures, and/or other errors, the complete original audio data stream may not be received over both the first and second wireless communication pathways. The server processor may use portions of the original audio data stream received over either or both of the first and second communication pathways to reconstruct the original audio data stream. In this manner, though one or both of the wireless communication pathways may not achieve complete transmission of the original audio data stream, the server processor may be able to reconstruct the original audio data stream with the portions actually received. In an embodiment, reconstructing the continuous stream of audio data using the continuous streams of audio data received from either or both of the first and second communication pathways may include comparing the two continuous streams of audio data to determine missing segments in one continuous stream of audio data. Based on the missing portions, the portions to be filed from the other continuous stream of audio data may be determined and/or repeat segments may be discarded. The reconstructed continuous stream of audio data may be transmitted from the server to the second device via the third communication pathway in block 416. A continuous stream of audio data from the second device may also be received in block 416 and transmitted to the first device via the first and second wireless communication pathways in blocks 410 and 412.

In operation, the first device may be continually transmitting and receiving data with the server via the first and second communications pathways in blocks 410 and 412. Data received at the server from the first device may be reconstructed in block 414 and transmitted to the second device via the third communication pathway in block 416. In an embodiment, data received at the server from the second device may be transmitted from the server to the first device via both the first and second wireless communication pathways. In this manner, two copies of the same data received from the second device may be sent from the server to the first device. The dual communication pathways established between the first device and the server may improve call quality/reliability.

Figure 5:
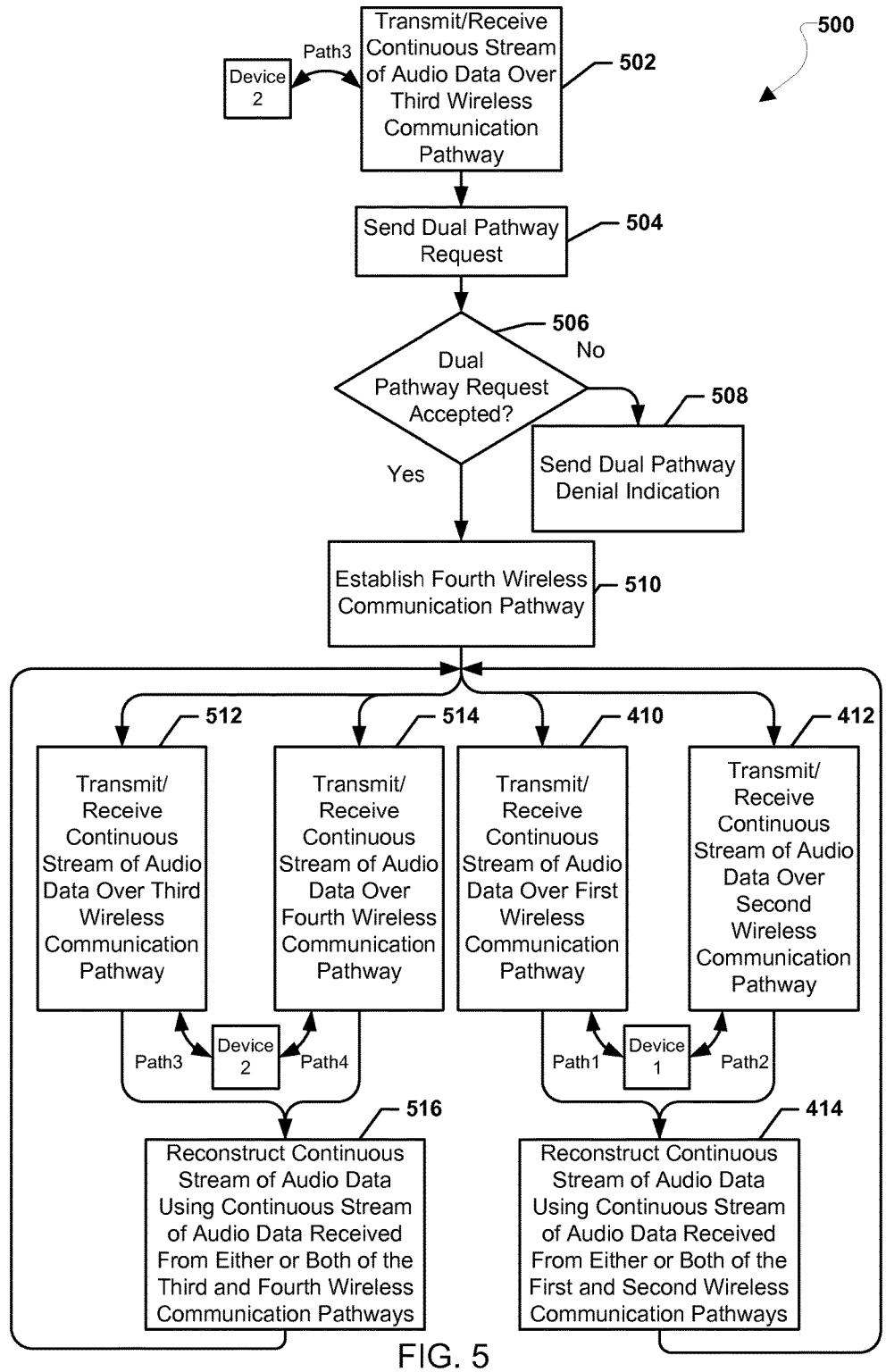
FIG. 5 is a process flow diagram illustrating an embodiment method for managing the transmission/reception of data between two communications devices over different wireless communications pathways based on the acceptance of a dual communication pathway request.

FIG. 5 illustrates an embodiment method 500 for managing the transmission/reception of data between two communication devices over different communication pathways. In an embodiment in which the second device is a wireless device, method 500 may be used in conjunction with method 400 to establish additional wireless communication pathways between the server and the second wireless device. In an embodiment, the operations of method 500 may be implemented by the processor of a server. In block 502 the server processor may transmit/receive a continuous stream of audio data over a third wireless communication pathway. As an example, the third wireless communication pathway may be established between the server and the second wireless device over a 3G wireless network in a manner similar to that of block 416 discussed above with reference to FIG. 4.

In block 504 the server processor may send a dual communication pathway request to the second wireless device. In an embodiment, a dual communication pathway request may be a request sent from the server to the second wireless device to indicate that more than one wireless communication pathway may be established and to present the opportunity to accept or prevent the establishment of dual pathway communications with the server. In an embodiment, a dual communication pathway request may be sent upon a determination by the server processor that the current call is designated a high priority call. In another embodiment, a dual communication pathway request may be sent automatically by the server processor based on a prediction that the second wireless device is approaching a limited cellular coverage area, or dead zone. As an example, the server processor may use location and velocity vector information received from the second wireless device to determine a likely path of travel for the second wireless device. The server processor may compare the likely path of travel to a cellular coverage map to predict whether the second wireless device will enter or is approaching a limited cellular coverage area, or dead zone. Upon the prediction that the second wireless device is approaching a limited cellular coverage area, or dead zone, the dual communication pathway request may be sent. In a further embodiment, dual communication pathway requests may be sent based on user, server, and/or device settings, caller IDs, call quality information, time of day, day of the week, network usage levels, cost determinations (e.g., data pricing information), power usage, device battery level information, data usage, call type (e.g., direct dialed call, transferred call, conference call), etc. In an embodiment, the dual communication pathway request may be sent via the third wireless communication pathway. In another embodiment, the dual communication pathway request may be sent outside the third wireless communication pathway.

In determination block 506 the server processor may determine whether the dual communication pathway request was accepted. In an embodiment, the server processor may determine whether a dual communication pathway request was accepted based on a message received from the second wireless device, such as message containing a dual communication pathway acceptance indication or a message containing a dual communication pathway denial indication. If a dual communication pathway request is not accepted (i.e., determination block 506="No"), in block 508 the server may send a dual communication pathway denial indication to the first wireless device.

If a dual communication pathway request is accepted (i.e., determination block 506="Yes"), in block 510 the server may establish a fourth wireless communication pathway between the server and the second wireless device. In an embodiment, the fourth wireless communication pathway may be a wireless communication pathway different from the third wireless communication pathway. As an example, if the third wireless communication pathway is a 3G call, the fourth wireless communication pathway may be a separate 3G call. In an embodiment, the server processor may be configured to establish the third and fourth wireless communication pathways using different wireless protocols. As an example, the third wireless communication pathway may be established using the Voice Over Internet Protocol and the fourth wireless communication pathway may be established using the Real-Time Transport Protocol. In an embodiment, the third and fourth wireless communication pathways may be established over entirely different wireless networks. As an example, the third wireless communication pathway may be established over a 3G network, and the fourth wireless communication pathway may be established over a Wi-Fi network. As another example, the third wireless communication pathway may be established over a 3G network, and the fourth wireless communication pathway may be established over an LTE network.

In parallel, in blocks 512 and 514, respectively, the server processor may transmit/receive the continuous stream of the same audio data over the third wireless communication pathway and transmit/receive the continuous stream of the same audio data over the fourth wireless communication pathway. In this manner, the same audio data may be transmitted and/or received over two wireless communication pathways. As discussed above, the third and fourth wireless communication pathways may be different (e.g., different protocols, different networks, etc). However, the audio data itself transmitted and/or received via the third and fourth wireless communication pathways may be the same. As an example, the same voice call may be transmitted/received over both the third and fourth wireless communication pathway. In this manner, the transmission of the same data set over dual communication pathways may increase call reliability/quality because the chance for lost data may be reduced.

In block 516 the server processor may reconstruct the continuous stream of audio data using the continuous streams of audio data received from either or both of the third and fourth communication pathways. In an embodiment, the server processor may use portions of the original audio data stream received over either or both of the third and fourth communication pathways to reconstruct the original audio data stream. In this manner, though one or both of the wireless communication pathways may not achieve complete transmission of the original audio data stream, the server processor may be able to reconstruct the original audio data stream with the portions actually received. In an embodiment, reconstructing the continuous stream of audio data using the continuous streams of audio data received from either or both of the third and fourth communication pathways may include comparing the two continuous streams of audio data to determine missing segments in one continuous stream of audio data. Based on the missing portions, the portions to be filed from the other continuous stream of audio data may be determined and/or repeat segments may be discarded.

Additionally, in parallel to the operations of method 500 performed in blocks 512, 514, and 516, the operations of like numbered blocks 410, 412, and 414 of method 400 described above with reference to FIG. 4 may be performed by the server processor to transmit/receive data to/from the first wireless device via the first wireless communication pathway and the second wireless communication pathway. In this manner, the same audio data may be continually transmitted and received between the first wireless device and the second wireless device across the server via dual communications pathways established between both devices and the server. The additional wireless communications pathways between both devices and the server may improve call quality/reliability.

Figure 6:
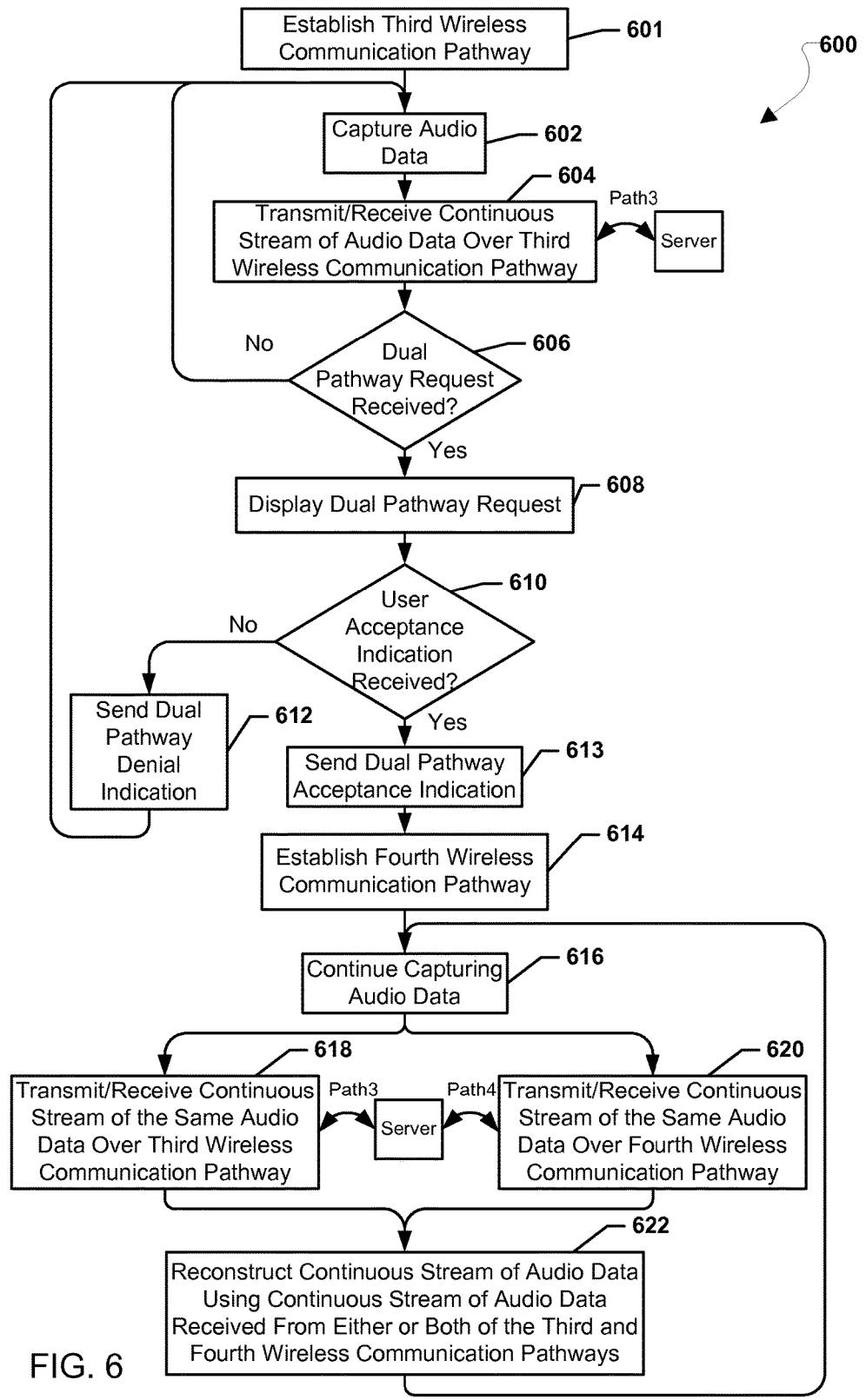
FIG. 6 is a process flow diagram illustrating a second embodiment method for transmitting/receiving dual pathway communications at a wireless device.

FIG. 6 illustrates an embodiment method 600 for transmitting/receiving dual pathway communications in a wireless device. In an embodiment, the operations of method 600 may be performed by a processor of a wireless device. In block 601 the wireless device processor may establish a third wireless communication pathway. In an embodiment, the third wireless communication pathway may be established between the wireless device and a server. As an example, the wireless communication pathway may be established between the wireless device and the server over a 3G wireless network. In an embodiment, the third wireless communication pathway may be established in response to a call received via the server from another wireless device. In block 602 the wireless device processor may capture audio data. In an embodiment, capturing audio data may include receiving audio input from a microphone of the wireless device and preparing the audio data for transmission, as well as converting received data to audio output and sending the audio output to a speaker of the wireless device for output to a user. In block 604 the wireless device processor may transmit/receive a continuous stream of audio data over the third wireless communication pathway. In an embodiment, the continuous stream of audio data may be the phone conversation occurring between two or more users.

In determination block 606 the wireless device processor may determine whether a dual communication pathway request has been received. In an embodiment, a dual communication pathway request may be a request sent from a server to the wireless device to indicate that more than one wireless communication pathway may be established, and to present the wireless device with the opportunity to accept or prevent the establishment of dual pathway communications with the server. In an embodiment, the dual communication pathway request may be a message received from the server, such as message containing a dual communication pathway request indication. If a dual communication pathway request is not received (i.e., determination block 606="No"), in block 602 the wireless device processor may continue to capture audio data and in block 604 may transmit/receive the audio data over the third wireless communication pathway.

If a dual communication pathway request is received (i.e., determination block 606="Yes"), in block 608 the wireless device processor may cause a display of the wireless device to display the dual communication pathway request. In an embodiment, the dual communication pathway request may include information, such as information related to user, server, and/or device settings, caller IDs, call quality, time of day, day of the week, network usage levels, cost determinations (e.g., data pricing information), power usage, device battery levels, data usage, call type (e.g., direct dialed call, transferred call, conference call), etc. The dual communication pathway request displayed by the wireless device may include at least a portion of the information included in the dual communication pathway request. In this manner, the user of the wireless device may be provided with information about the costs and benefits associated with enabling dual pathway communications.

In determination block 610 the wireless device processor may determine whether a user acceptance indication may be received. In an embodiment, a user acceptance indication may be a user input indicating the user approves of the establishment of dual communication pathways, such as a button press event or touch screen selection. If a user does not accept the dual communication pathway request (i.e., determination block 610="No"), in block 612 the wireless device processor may send a dual communication pathway denial indication to the server, and the method 600 may proceed to block 602. If a user does accept the dual communication pathway request (i.e., determination block 610="Yes"), in block 613 the wireless device processor may send a dual communication pathway acceptance indication to the server. In an embodiment, the dual communication pathway acceptance indication may be a message sent from the wireless device to the server indicating an additional wireless communication pathway may be established.

In block 614, the wireless device processor may establish a fourth wireless communication pathway. In an embodiment, the fourth wireless communication pathway may be a wireless communication pathway different from the third wireless communication pathway. In an embodiment, the wireless device processor may be configured to establish more than one call at a time, and the fourth wireless communication pathway may be established as a second call between the wireless device and the server. As an example, if the third wireless communication pathway is a 3G call, the fourth wireless communication pathway may be a separate 3G call. In an embodiment, the wireless device processor may be configured to establish the third and fourth wireless communication pathways using the same and/or different antennas. In an embodiment, the wireless device processor may be configured to establish the third and fourth wireless communication pathways using different wireless protocols. As an example, the third wireless communication pathway may be established using the Voice Over Internet Protocol and the fourth wireless communication pathway may be established using the Real-Time Transport Protocol. In an embodiment, the third and fourth wireless communication pathways may be established over entirely different wireless networks. As an example, the third wireless communication pathway may be established over a 3G network, and the fourth wireless communication pathway may be established over a Wi-Fi network. As another example, the third wireless communication pathway may be established over a 3G network, and the fourth wireless communication pathway may be established over an LTE network.

In block 616 the wireless device processor may continue capturing audio data in the manner discussed above with reference to block 602. In parallel, in blocks 618 and 620, respectively, the wireless device processor may transmit/receive the continuous stream of the same audio data over the third wireless communication pathway and transmit/receive the continuous stream of the same audio data over the fourth wireless communication pathway. In this manner, the same audio data may be transmitted and/or received over two wireless communication pathways. As discussed above, the third and fourth wireless communication pathways may be different (e.g., different protocols, different networks, different antennas, etc). However, the audio data itself transmitted and/or received via the third and fourth wireless may be the same. As an example, in a voice call the captured audio data may be the voice call, and the same voice call may be transmitted/received over both the third and fourth wireless communication pathway. In this manner, the transmission of the same data set over dual communication pathways may increase call reliability/quality because the chance for lost data may be reduced.

In block 622 the wireless device processor may reconstruct the continuous stream of audio data using the continuous streams of audio data received from either or both of the third and fourth communication pathways. In an embodiment, two audio data streams may be received over the two wireless communications pathways. The two audio data streams may have been generated from the same original audio data stream. However, due to transmission interference, loss of signal, equipment failures, and/or other errors, the complete original audio data stream may not be received over both the third and fourth wireless communication pathways. The wireless device processor may use portions of the original audio data stream received over either or both of the third and fourth communication pathways to reconstruct the original audio data stream. In this manner, though one or both of the wireless communication pathways may not achieve complete transmission of the original audio data stream, the wireless device processor may be able to reconstruct the original audio data stream with the portions actually received. In an embodiment, reconstructing the continuous stream of audio data using the continuous streams of audio data received from either or both of the third and fourth communication pathways may include comparing the two continuous streams of audio data to determine missing segments in one continuous stream of audio data. Based on the missing portions, the portions to be filed from the other continuous stream of audio data may be determined and/or repeat segments may be discarded. The method 600 may proceed to block 616, and in this manner may continually capture, transmit/receive, and reconstruct audio data.

Figure 7:
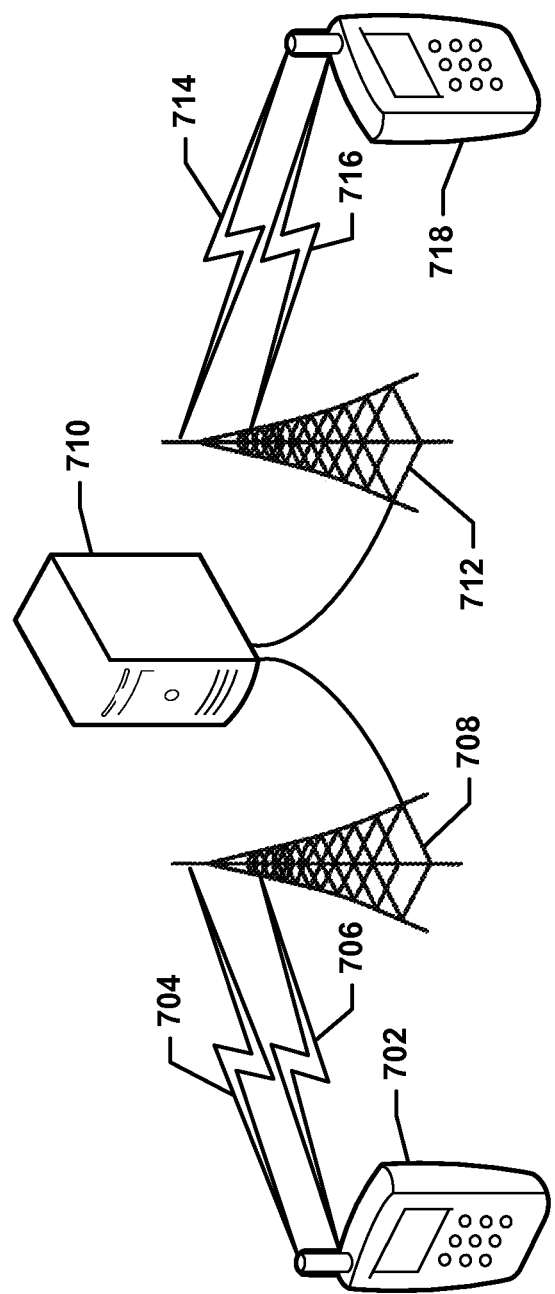
FIG. 7 illustrates example wireless communication pathways established according to the various embodiments.

FIG. 7 illustrates example wireless communication pathways established according to the embodiment methods 200, 300, 400, 500, and/or 600 using the same type wireless network within each wireless communication pathway. A first wireless device 702 may establish a first wireless communication pathway with the server 710. The first wireless communication pathway may include a wireless connection 704, such as a 3G connection, between the first wireless device 702 and a wireless network 708, such as a 3G network. The wireless network 708 may be in communication with the server 710. The first wireless device 702 may also establish a second wireless communication pathway with the server 710. The second wireless communication pathway may include a wireless connection 706, such as a 3G connection, between the first wireless device 702 and the wireless network 708, such as a 3G network. The server 710 may establish a third wireless communication pathway with a second wireless device 718. The server 710 may be in communication with a wireless network 712, such as a 3G network. In an embodiment, the wireless networks 708 and 712 may be the same wireless network, or may be the same type wireless networks run by different carriers/operators. The third wireless communication pathway may include a wireless connection 714, such as a 3G connection, between the wireless network 712 and the second wireless device 718. The server 710 may establish a fourth wireless communication pathway with the second wireless device 718. The fourth wireless communication pathway may include a wireless connection 716, such as a 3G connection, between the wireless network 712 and the second wireless device 718.

Example operations that may be performed by the first wireless device 702, server 710, and the second wireless device 718 to establish dual communications according to the various embodiments may include the first wireless device 702 connecting to the server via wireless connection 704 and the wireless network 708 to establish the first wireless pathway. As an example, the first wireless device 702 may initiate a voice call intended for the second wireless device, may indicate the call is a high priority call, and establish the first wireless communication pathway. The server 710 may connect the call to the second wireless device 718 via the wireless network 712 and the wireless connection 714 to establish the third wireless pathway. Audio data may be captured at both the first wireless device 702 and the second wireless device 718. The captured audio data may be transmitted/received between the first wireless device 702 and second wireless device 718 via the server 710. In response to a trigger event, such as the user indicating the call may be high priority, the first wireless device 702 may establish the second wireless communication pathway to the server 710 via the wireless connection 706 and the wireless network 708. The first wireless device 702 may then transmit and receive the same data via the first and second wireless communication pathways. The server 710 may identify the call is a high priority call and may send a dual communication pathway request to the second wireless device 718. In response to the user approving dual pathway communications, the server 710 may establish the fourth wireless communication pathway to the server 710 via the wireless connection 716 and the wireless network 712. The second wireless device 718 may then transmit and receive the same data via the third and fourth wireless communication pathways. In this manner, while four communication pathways may be established, the same continuous audio data stream that is the audio call may be continuously transmitted and/or received across two wireless communication pathways between each of the wireless devices 702, 718 and the server 710.

Figure 8:
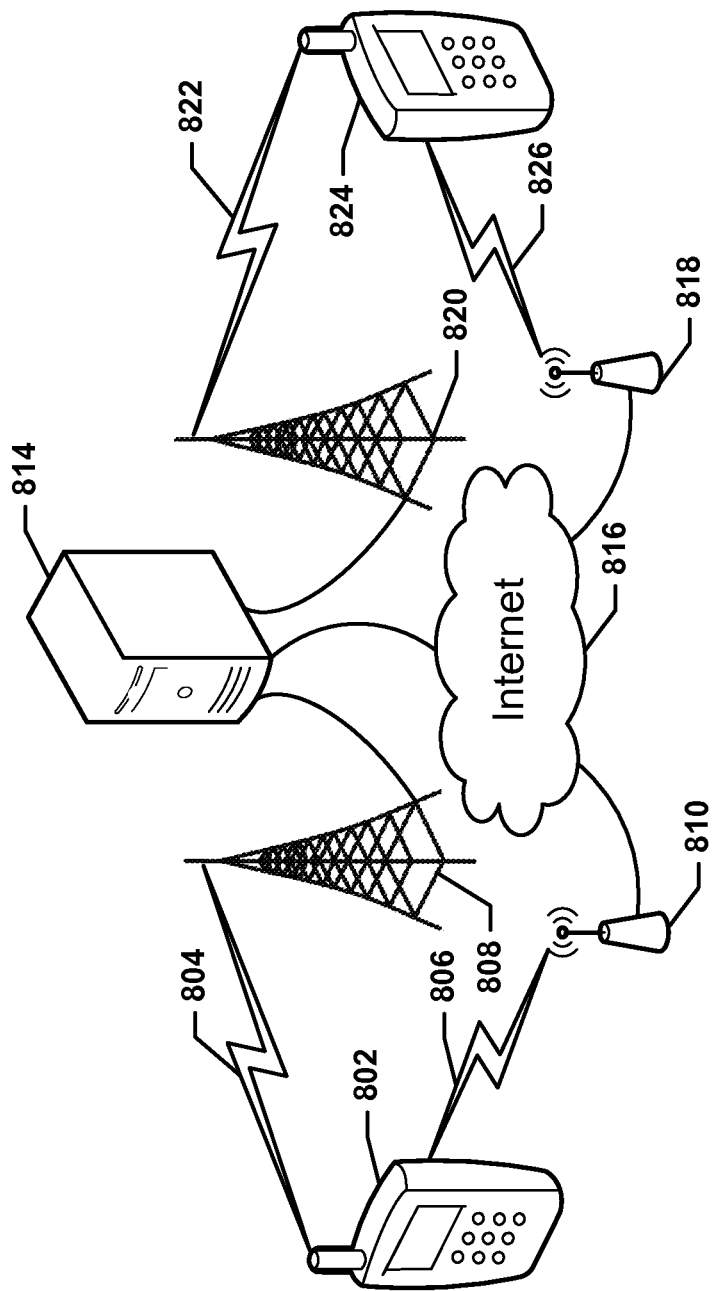
FIG. 8 illustrates additional example wireless communication pathways established according to the various embodiments.

FIG. 8 illustrates example wireless communication pathways established according to the embodiment methods 200, 300, 400, 500, and/or 600 using different wireless network types within each wireless communication pathway. A first wireless device 802 may establish a first wireless communication pathway with the server 814. The first wireless communication pathway may include a wireless connection 804, such as a 3G connection, between the first wireless device 802 and a wireless network 808, such as a 3G network. The wireless network 808 may be in communication with the server 814. The first wireless device 802 may also establish a second wireless communication pathway with the server 814. The second wireless communication pathway may include a wireless connection 806, such as a Wi-Fi connection, between the first wireless device 802 and a wireless network 810, such as a Wi-Fi access point, connected to the Internet 816. The server 814 may be connected to the Internet 816, and in this manner the second wireless communication pathway between the server 814 and the first wireless device 802 may be established. The server 814 may establish a third wireless communication pathway with a second wireless device 824. The server 814 may be in communication with a wireless network 820, such as a 3G network. In an embodiment, the wireless networks 808 and 820 may be the same wireless network, or may be the same type wireless networks run by different carriers/operators. The third wireless communication pathway may include a wireless connection 822, such as a 3G connection, between the wireless network 820 and the second wireless device 824. The server 814 may establish a fourth wireless communication pathway with the second wireless device 824. The fourth wireless communication pathway may include a wireless connection 826, such as a Wi-Fi connection, between the second wireless device 824 and a wireless network 818, such as a Wi-Fi access point, connected to the Internet 816. The server 814 may be connected to the Internet 816, and in this manner the second wireless communication pathway between the server 814 and the second wireless device 824 may be established.

Example operations that may be performed by the first wireless device 802, server 814, and the second wireless device 824 to establish dual communications according to the various embodiments may be the same as those discussed above with reference to FIG. 7, except that the first, second, third, and fourth wireless communication pathways may be established using different wireless communication protocols and/or entirely different wireless networks.

Figure 9:
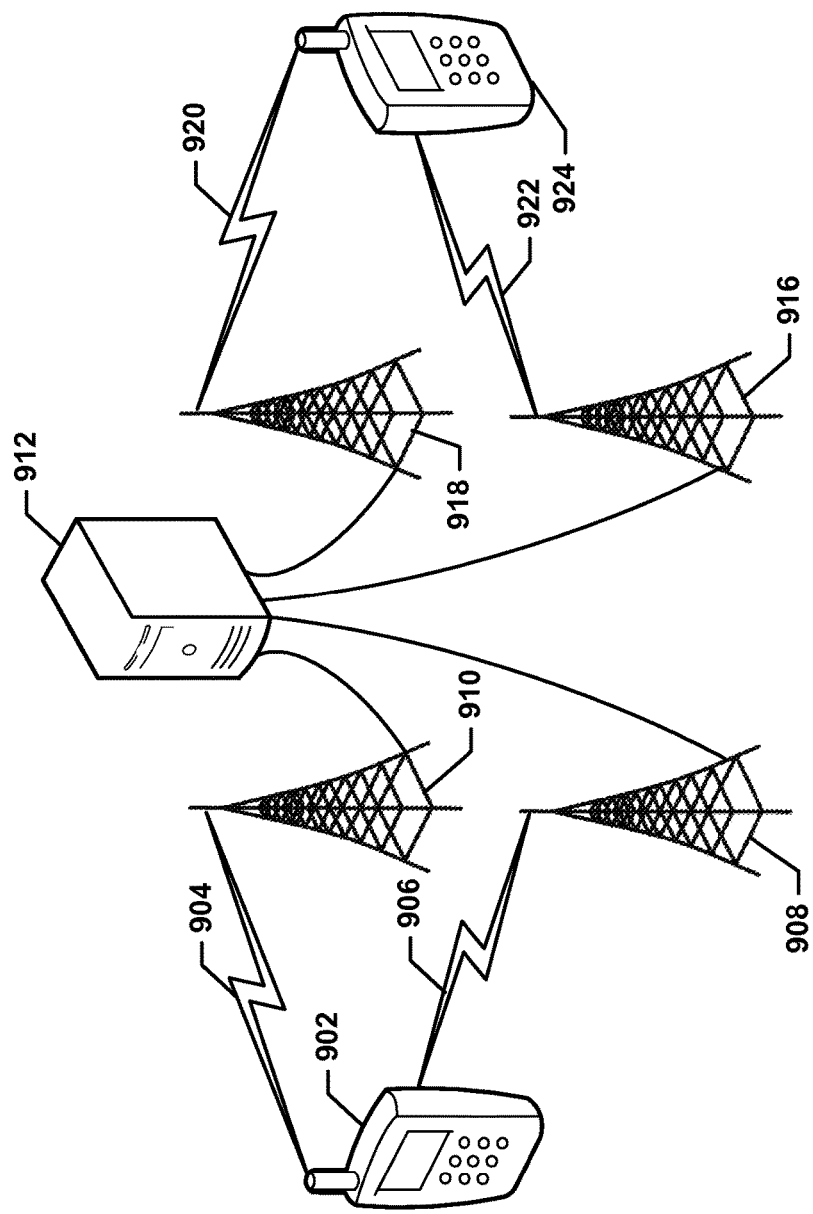
FIG. 9 illustrates additional example wireless communication pathways established according to the various embodiments.

FIG. 9 illustrates example wireless communication pathways established according to the embodiment methods 200, 300, 400, 500, and/or 600 using different wireless network types within each wireless communication pathway. A first wireless device 902 may establish a first wireless communication pathway with the server 912. The first wireless communication pathway may include a wireless connection 904, such as a 3G connection, between the first wireless device 902 and a wireless network 910, such as a 3G network. The wireless network 910 may be in communication with the server 912. The first wireless device 902 may also establish a second wireless communication pathway with the server 912. The second wireless communication pathway may include a wireless connection 906, such as an LTE connection, between the first wireless device 902 and the wireless network 908, such as an LTE network. The server 912 may establish a third wireless communication pathway with a second wireless device 924. The server 912 may be in communication with a wireless network 918, such as a 3G network. In an embodiment, the wireless networks 918 and 910 may be the same wireless network, or may be the same type wireless networks run by different carriers/operators. The third wireless communication pathway may include a wireless connection 920, such as a 3G connection, between the wireless network 918 and the second wireless device 924. The server 912 may establish a fourth wireless communication pathway with the second wireless device 924. The fourth wireless communication pathway may include a wireless connection 922, such as an LTE connection, between the wireless network 916, such as an LTE network, and the second wireless device 924. The wireless network 916 may be in communication with the server 912. In an embodiment, the wireless networks 916 and 908 may be the same wireless network, or may be the same type of wireless networks run by different carriers/operators.

Example operations that may be performed by the first wireless device 902, server 914, and the second wireless device 924 to establish dual communications according to the various embodiments may be the same as those discussed above with reference to FIG. 7, except that the first, second, third, and fourth wireless communication pathways may be established using entirely wireless networks.

Figure 10:
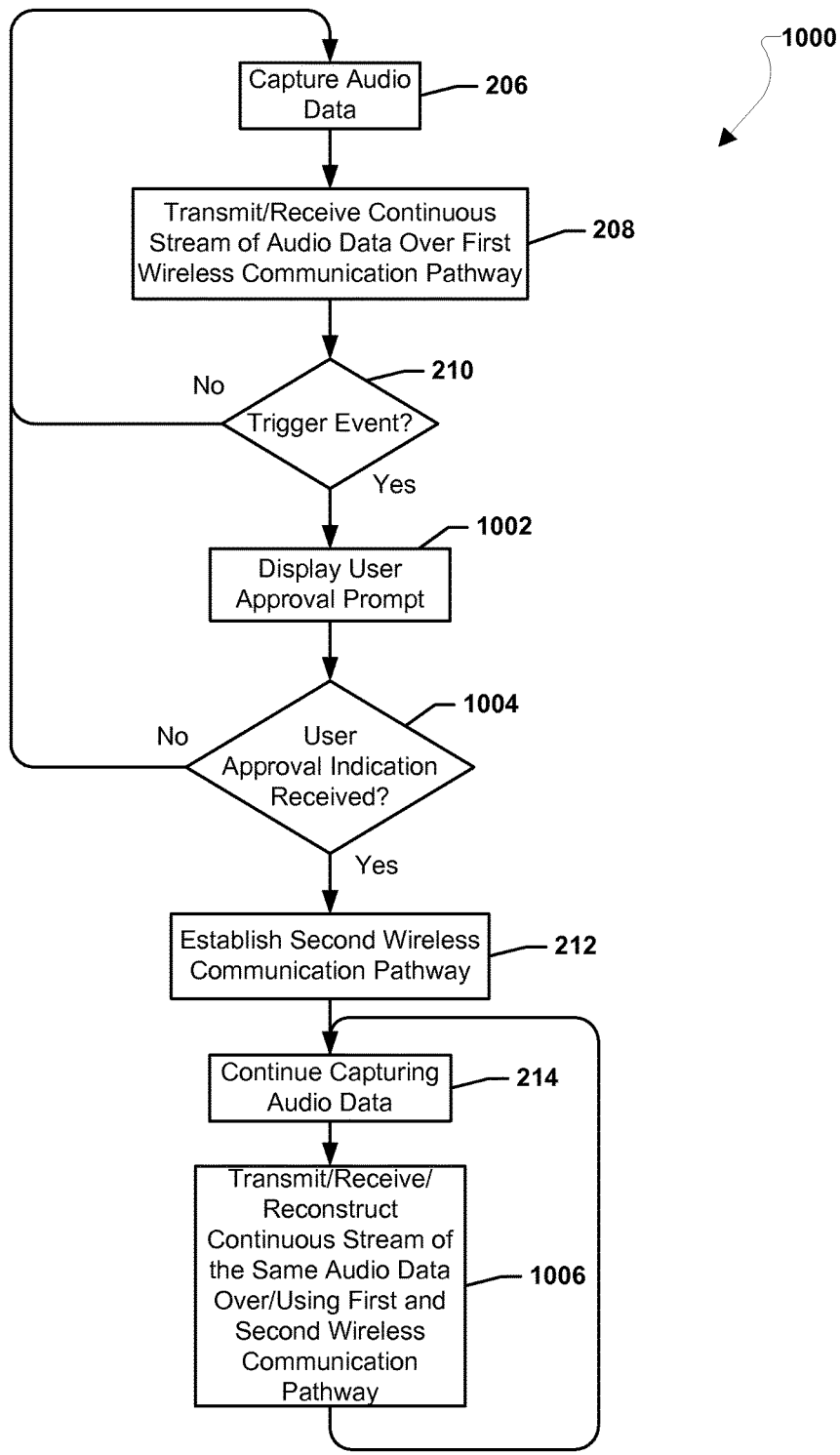
FIG. 10 is a process flow diagram illustrating an embodiment method for establishing additional wireless communication pathways in response to user approval.

FIG. 10 illustrates an embodiment method 1000 for transmitting/receiving dual pathway communications at a wireless device, similar to method 200 described above with reference to FIG. 2, except that in method 1000 additional wireless communication pathways may be established in response to user approval. In blocks 206, 208, and 210 the wireless device processor may perform operations of like numbered blocks of method 200 as discussed above with reference to FIG. 2. If a trigger event occurs (i.e., determination block 210="Yes"), in block 1002 the wireless device processor may display a user approval prompt on a display of the wireless device. In an embodiment, the user approval prompt may be an indication to the user of the wireless device that dual pathway communications may be established and/or an indication of a request for user input to indicate approval or disapproval of dual pathway communications. In a further embodiment, the user approval prompt may include information associated with dual pathway communications, such as information related to user, server, and/or device settings, caller IDs, call quality, time of day, day of the week, network usage levels, cost determinations (e.g., data pricing information), power usage, device battery levels, data usage, call type (e.g., direct dialed call, transferred call, conference call), etc. In this manner, the user of the wireless device may be provided with information about the costs and benefits associated with enabling dual pathway communications.

In determination block 1004, the wireless device processor may determine whether a user approval indication is received. In an embodiment, a user approval indication may be a user input, such as a button press or touch screen selection, input in response to the display of the user approval prompt. If user approval is not received (i.e., determination block 1004="No"), the method 1000 may proceed to block 206 and continue with single pathway communications. If user approval is received (i.e., determination block 1004="Yes"), in blocks 212 and 214 the wireless device processor may perform operations of like numbered blocks of method 200 as discussed above with reference to FIG. 2. In block 1006 the wireless device processor may transmit, receive, and/or reconstruct the continuous stream of the same audio data over/using the first and second wireless communication pathway by performing the operations of block 216, 218, and 220 discussed above with reference to FIG. 2.

Figure 11:
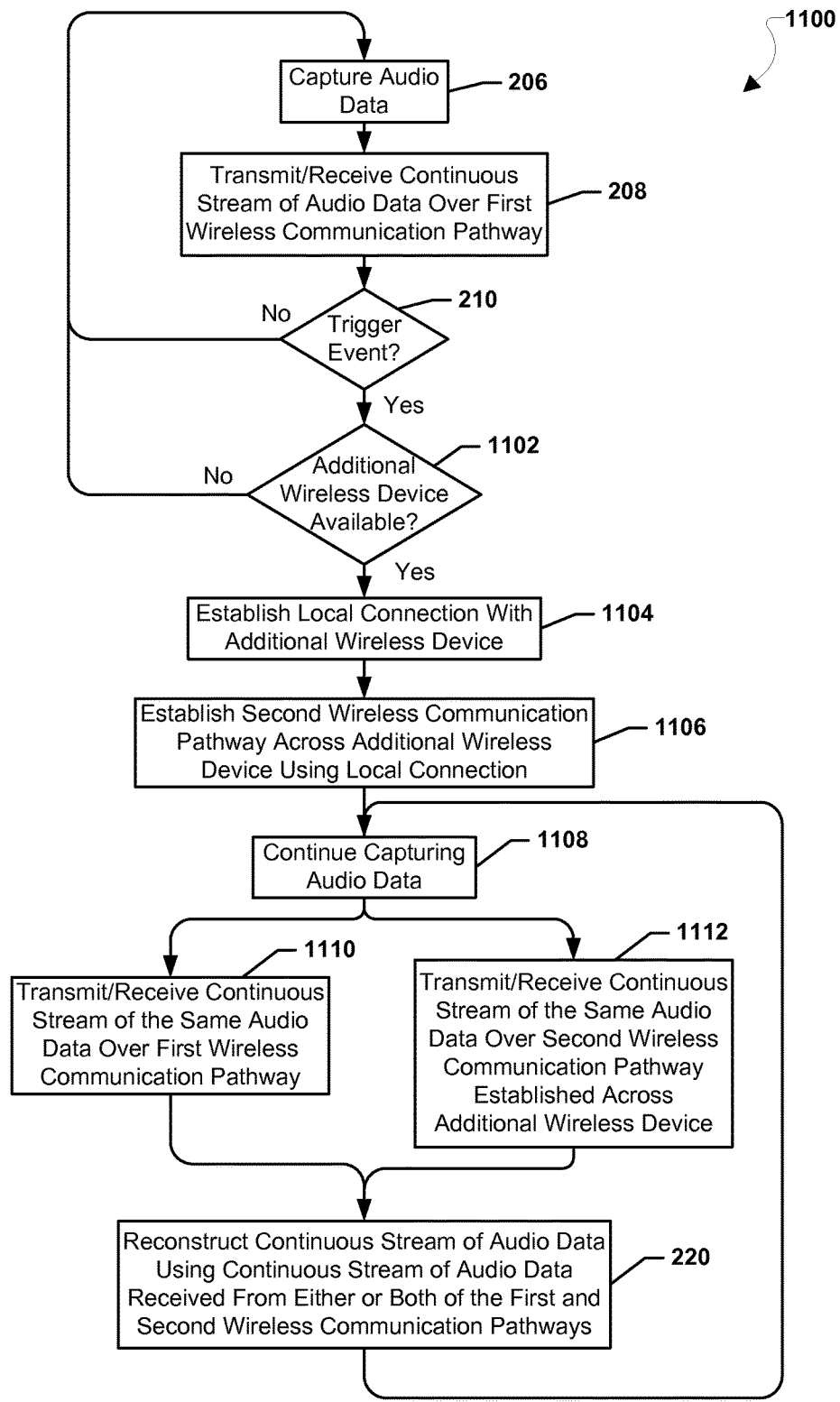
FIG. 11 is a process flow diagram illustrating an embodiment method for establishing an additional wireless communication pathway across an additional wireless device.

FIG. 11 illustrates an embodiment method 1100 for establishing dual pathway communications across an additional wireless device, similar to method 200 described above with reference to FIG. 2, except that in method 1100 additional wireless communication pathways are established across an additional wireless device. In blocks 206, 208, and 210 the wireless device processor may perform operations of like numbered blocks of method 200 as discussed above with reference to FIG. 2. If a trigger event occurs (i.e., determination block 210="Yes"), in block 1102 the wireless device processor may determine whether an additional wireless device may be available. In an embodiment, an additional wireless device may be available if the additional wireless device is enabled to transmit/receive communications to/from the wireless device and a destination device for the first wireless communication pathway. In an embodiment, the additional wireless device may indicate it availability by responding to an availability query sent from the wireless device. If no additional wireless device is available (i.e., determination block 1102="No"), the method 1100 may proceed to block 206 and continue with single pathway communications.

If an additional wireless device is available (i.e., determination block 1102="Yes"), in block 1104 the wireless device processor may establish a local connection with the additional wireless device. In an embodiment, the local connection may be a wireless connection, such as a BlueTooth® connection, near field communications connection, etc. In block 1106 the wireless device processor may establish a second wireless connection pathway across the additional wireless device using the local connection. In an embodiment, the wireless device processor may interact with a dual pathway communications facilitation client on the additional wireless device to establish a second wireless communication pathway. In a further embodiment, the dual pathway communications facilitation client on the additional wireless device may manage the necessary interactions to communicate information to/from the wireless device over the local connection, and to/from the destination device (e.g., server and/or second wireless device). In block 1108 the wireless device processor may continue capturing audio data in the manner discussed above with reference to block 206.

In parallel, in blocks 1110 and 1112, respectively, the wireless device processor may transmit/receive the continuous stream of the same audio data over the first wireless communication pathway and transmit/receive the continuous stream of the same audio data over the second wireless communication pathway established across the additional wireless device. In this manner, the same audio data may be transmitted and/or received over two wireless communication pathways. In this manner, the transmission of the same data set over dual communication pathways may increase call reliability/quality because the chance for lost data may be reduced. As discussed above with reference to FIG. 2, in block 220 the wireless device processor may reconstruct the continuous stream of audio data using the continuous streams of audio data received from either or both of the first and second communication pathways.

Figure 12:
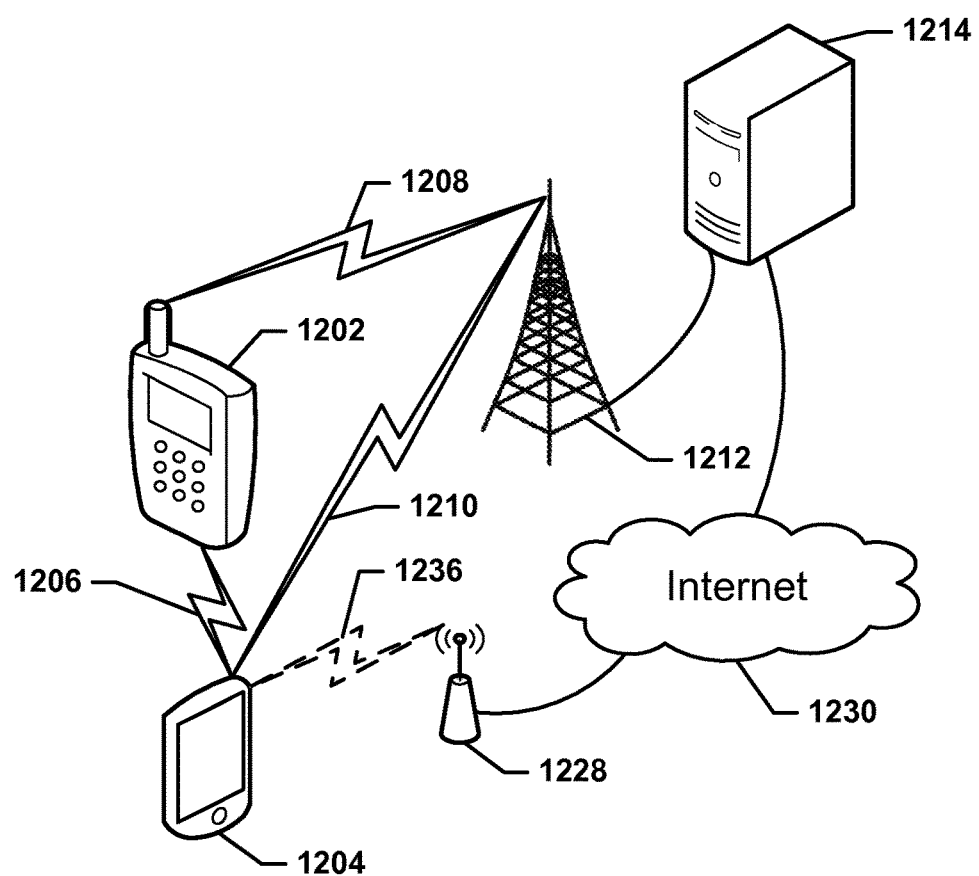
FIG. 12 illustrates example wireless communication pathways established across additional wireless devices according to the various embodiments.

FIG. 12 illustrates example wireless communication pathways established according to the embodiment methods 1100. A first wireless device 1202 may establish a first wireless communication pathway with the server 1214. The first wireless communication pathway may include a wireless connection 1208, such as a 3G connection, between the first wireless device 1202 and a wireless network 1212, such as a 3G network. The wireless network 1212 may be in communication with the server 1214. The first wireless device 1202 may also establish a second wireless communication pathway with the server 1214. The second wireless communication pathway may include a local wireless connection 1206, such as a Blue Tooth® connection, established between the first wireless device and an additional wireless device 1204. The additional wireless device 1204 may establish a wireless connection 1210, such as a 3G connection, between the additional wireless device 1204 and the wireless network 1212, such as a 3G network. In this manner, a second wireless communication pathway may be established across an additional wireless device. Alternatively, the additional wireless device 1204 may establish a wireless connection, such as a Wi-Fi connection with the wireless network 1228, such as wireless access point 1228. The wireless network 1228 may connect with the Internet 1230, and the server 1214 may connect to the Internet 1230. In this manner, a second wireless communication pathway may be established across an additional wireless device, as well as across a different network and/or using a different protocol.

Figure 13:
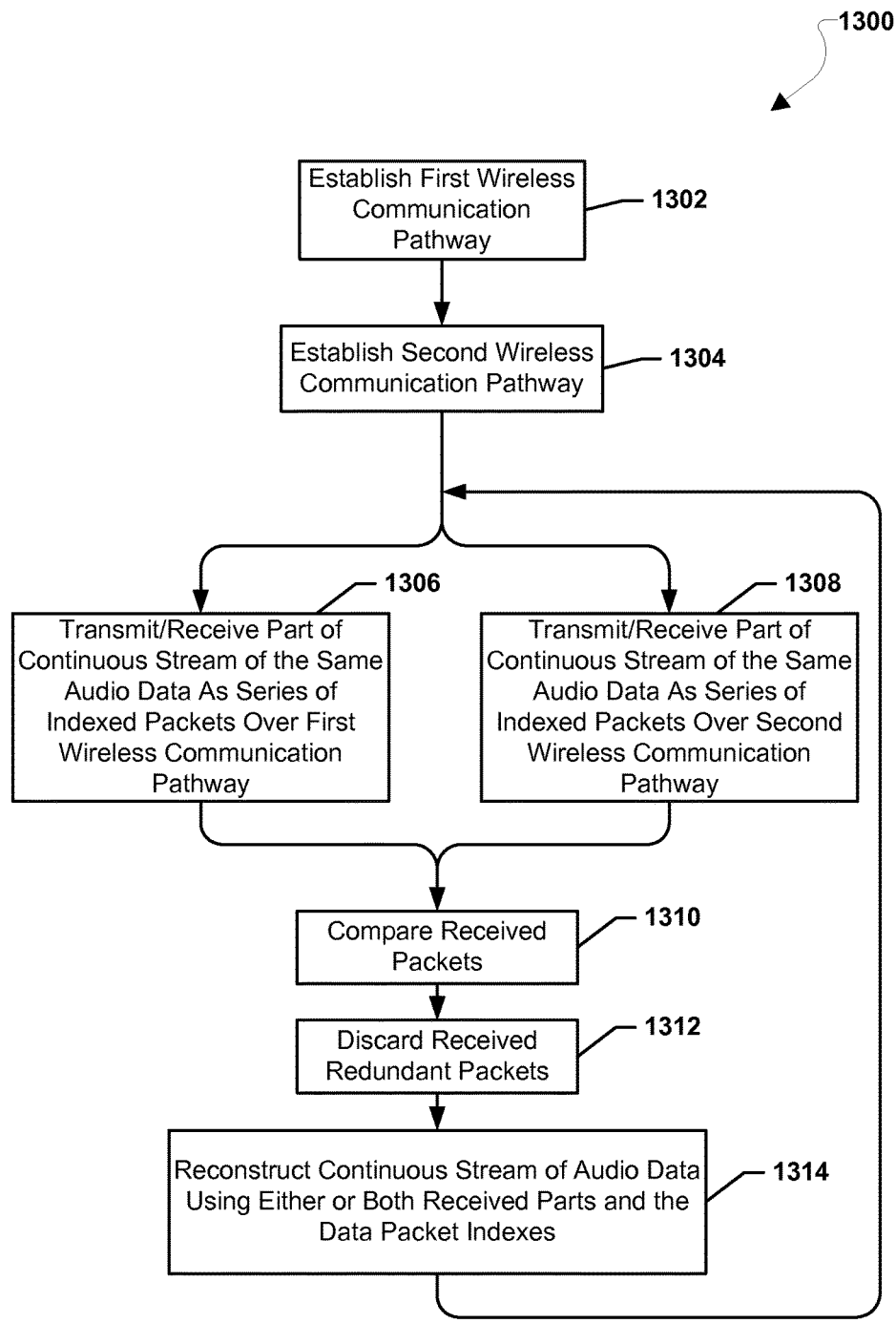
FIG. 13 is a process flow diagram illustrating an embodiment method for reconstructing continuous data streams based on data packet indexes.

FIG. 13 illustrates an embodiment method 1300 for reconstructing continuous data streams based on data packet indexes. In an embodiment, the operations of method 1300 may be implemented by the processor of a wireless device. In another embodiment, the operations of method 1300 may be performed by a processor of a server. In block 1302 the server/wireless device processor may establish a first wireless communication pathway. In an embodiment, a wireless communication pathway may be established between the server/wireless device and an initiating wireless device. As an example, the wireless communication pathway may be established between the server/wireless device and the initiating wireless device over a 3G wireless network.

In block 1304 the server/wireless device processor may establish a second wireless communication pathway. In an embodiment, the second wireless communication pathway may be a wireless communication pathway different from the first wireless communication pathway. In an embodiment, the server/wireless device processor may be configured to establish more than one call at a time, and second wireless communication pathway may be established as a second call between the initiating wireless device and the server/wireless device. As an example, if the first wireless communication pathway is a 3G call, the second wireless communication pathway may be a separate 3G call. In an embodiment, the server/wireless device processor may be configured to establish the first and second wireless communication pathways using different wireless protocols. As an example, the first wireless communication pathway may be established using the Voice Over Internet Protocol and the second wireless communication pathway may be established using the Real-Time Transport Protocol. In an embodiment, the first and second wireless communication pathways may be established over entirely different wireless networks. As an example, the first wireless communication pathway may be established over a 3G network, and the second wireless communication pathway may be established over a Wi-Fi network. As another example, the first wireless communication pathway may be established over a 3G network, and the second wireless communication pathway may be established over an LTE network.

In parallel, in blocks 1306 and 1308, respectively, the server/wireless device processor may transmit/receive part of the continuous stream of the same audio data as a series of indexed packets over the first wireless communication pathway and transmit/receive the continuous stream of the same audio data over the second wireless communication pathway. In this manner, the same audio data may be transmitted and/or received over two wireless communication pathways as the same series of indexed packets. As discussed above, the first and second wireless communication pathways may be different (e.g., different protocols, different networks, different antennas, etc). However, the audio data itself transmitted and/or received via the first and second wireless may be the same series of indexed packets. In this manner, the transmission of the same data set over dual communication pathways may increase call reliability/quality because the chance for lost data may be reduced.

In block 1310 the server/wireless device processor may compare the received packets. In an embodiment, the server/wireless device processor may compare the packet indexes for received packets to each other in order to identify missing packets and/or received redundant packets. In block 1312 the server/wireless device processor may discard received redundant packets. In this manner, redundant packets may be eliminated and the data storage needs for storing the two received data streams may be reduced.

In block 1314 the server/wireless device processor may reconstruct the continuous stream of audio data using either or both received parts and the data packet indexes. In an embodiment, missing packets from the part received via the first communication pathway may be replaced with packets received via the second communication pathway. The method 300 may then return to blocks 1306 and 1308 and continue to transmit/receive using the first and second wireless communication pathways.

Figure 14:
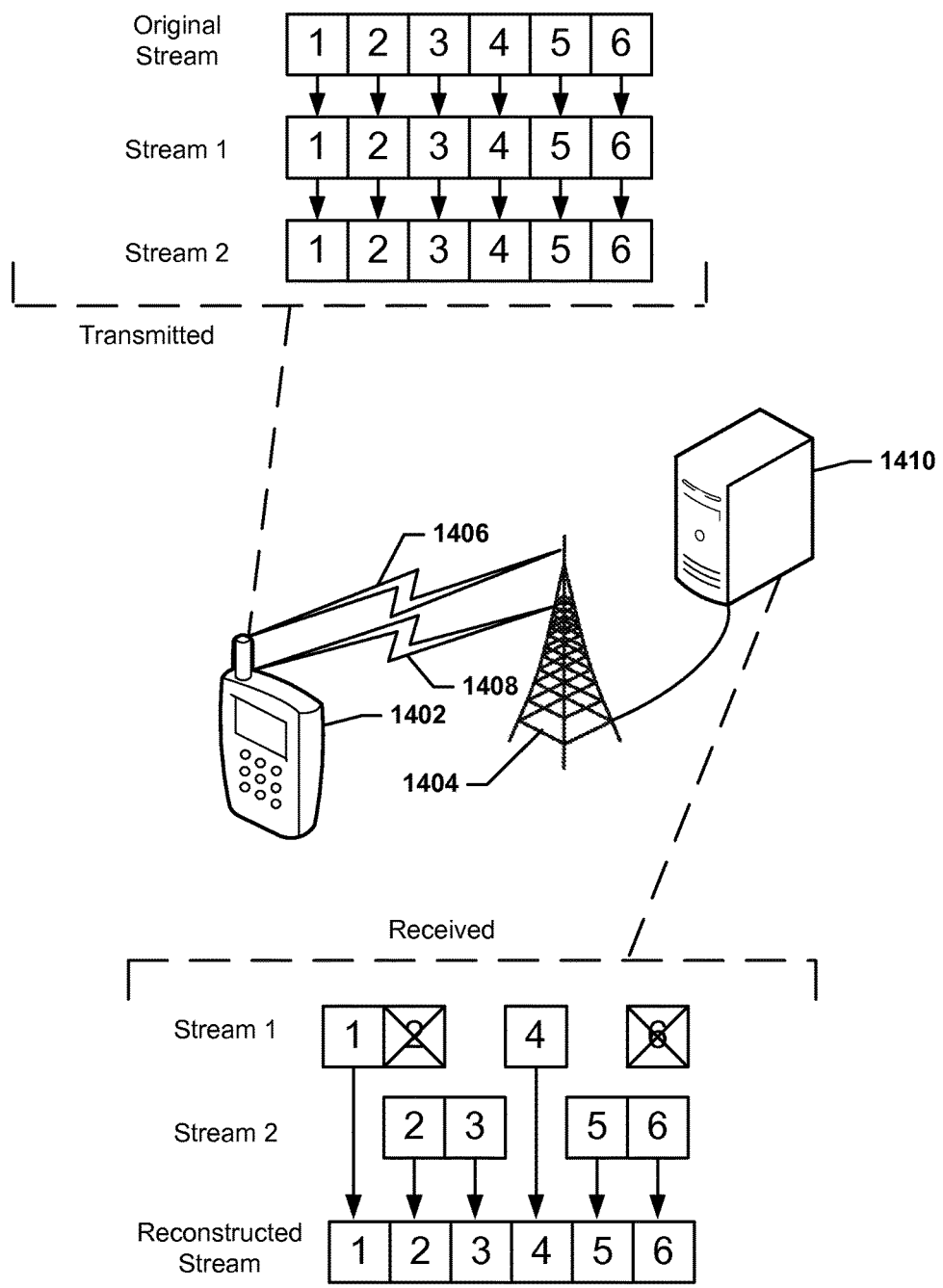
FIG. 14 illustrates example communications pathways established, and operations performed, to reconstruct a continuous data stream.

FIG. 14 illustrates example wireless communication pathways established according to the embodiment method 1300. A wireless device 1402 may establish a first wireless communication pathway with a server 1410 via a wireless connection 1406, such as a 3G connection, with a wireless network 1404, such as a 3G network. The wireless network 1404 may be in communication with the server 1410. The wireless device 1402 may also establish a second wireless communication pathway with the server 1410 via the wireless connection 1408, such as a 3G connection, with a wireless network 1404, such as a 3G network.

In operation, the wireless device 1402 may transmit/receive to/from the server the same continuous stream of indexed packets via the first wireless communication pathway and the second wireless communication pathway. As discussed above, the original stream may be sent via the first and second wireless communication pathways as two identical streams of indexed packets 1, 2, 3, 4, 5, and 6. While the same continuous stream may be transmitted, due to various communication errors, different streams, Stream 1 and Stream 2, may be received. As an example, received Stream 1 may include indexed packets 1, 2, 4, and 6, while received Stream 2 may include indexed packets 2, 3, 5, and 6. In an embodiment, the server 1410 (or alternatively the wireless device 1402 if transmitted from the server 1410 to the wireless device 1402) receiving Stream 1 and Stream 2 may compare Stream 1 to Stream 2, and discard the duplicate indexed packets 2 and 6 from Stream 1. In a further embodiment, the two streams, Stream 1 and Stream 2 may be combined to reconstruct the original data stream. The missing indexed packets from Stream 2 may be filled using the available packets from Stream 1. In this manner, the reconstructed stream may include indexed packets 1, 2, 3, 4, 5, and 6, and may be the same as the original stream.

Figure 15:
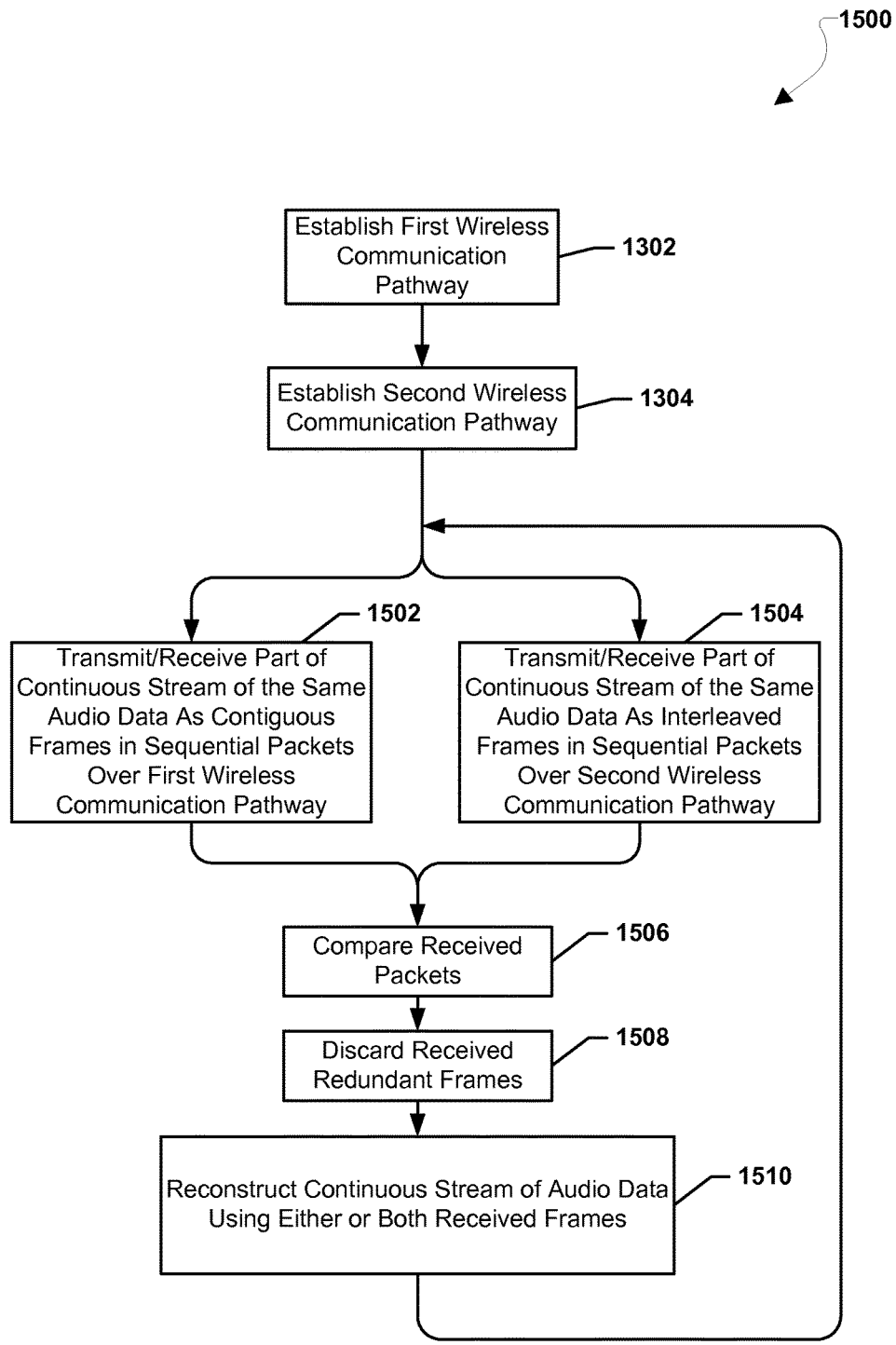
FIG. 15 is a process flow diagram illustrating an embodiment method for reconstructing continuous data streams based on data streams with different transmission structures.

FIG. 15 illustrates an embodiment method 1500 for reconstructing continuous data streams similar to method 1300 described above with reference to FIG. 13, except that in method 1500 the continuous data stream may be reconstructed based on data streams with different transmission structures. In an embodiment, the operations of method 1500 may be implemented by the processor of a wireless device. In another embodiment, the operations of method 1500 may be performed by a processor of a server. In blocks 1302 and 1304 the operations of like numbered blocks of method 1300 described above with reference to FIG. 13 may be performed by the server/wireless device processor to establish a first and second wireless communication pathway.

In block 1502 the server/wireless device processor may transmit/receive part of the continuous stream of the same audio data as contiguous frames in sequential packets over the first wireless communication pathway, and, in parallel, in block 1504 the server/wireless device processor may transmit/receive the continuous stream of the same audio data as interleaved frames in sequential packets over the second wireless communication pathway. In this manner, the same audio data may be transmitted and/or received over two wireless communication pathways using different transmission structures. As an example, in the first wireless communication pathway frames may be sent in contiguous structure in various packets, such as frames 1, 2, and 3 in a first packet and frames 4, 5, and 6 in a second packet. In the second wireless communication pathway frames may be sent in an interleaved structure in various packets, such as odd frames, 1, 3, and 5 in a first packet, and even frames 2, 4, and 6 in a second packet. As discussed above, the first and second wireless communication pathways may be different (e.g., different protocols, different networks, different antennas, etc). However, while transmitted in different orders, the audio data itself transmitted and/or received via the first and second wireless may be the same frames. In this manner, the transmission of the same data set over dual communication pathways may increase call reliability/quality because the chance for lost data may be reduced.

In block 1506 the server/wireless device processor may compare the received packets. In an embodiment, the server/wireless device processor may compare the packet indexes for received packets to each other in order to identify missing packets, received redundant packets, and/or identify the frames within each received packet. In block 1508 the server/wireless device processor may discard received redundant frames. In this manner, redundant frames may be eliminated and the data storage needs for storing the two received data streams may be reduced.

In block 1510 the server/wireless device processor may reconstruct the continuous stream of audio data using either or both received frames. In an embodiment, missing frames from the part received via the first communication pathway may be replaced with packets received via the second communication pathway. The method 1500 may then return to blocks 1502 and 1508 and continue to transmit/receive using the first and second wireless communication pathways.

Figure 16:
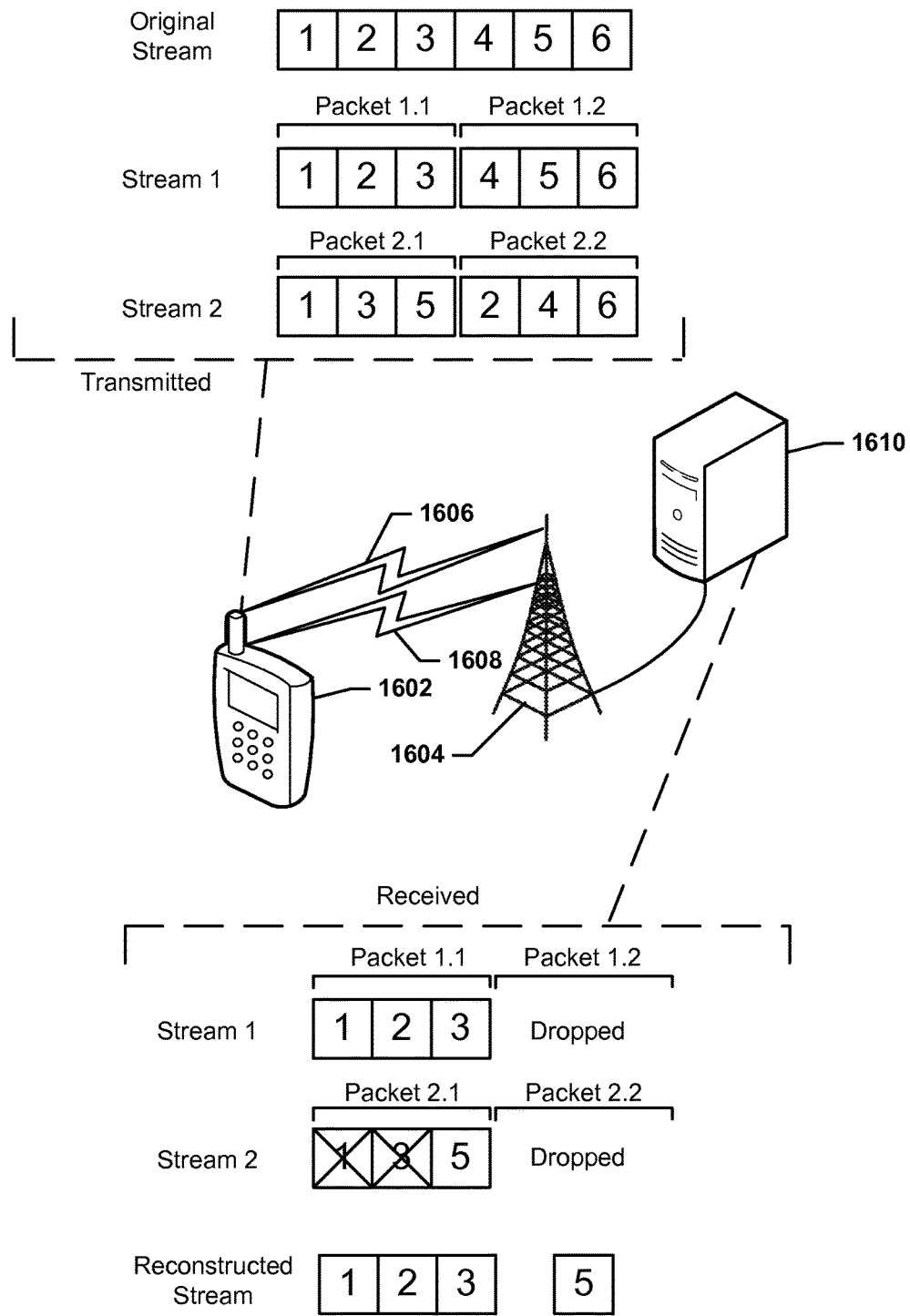
FIG. 16 illustrates additional example communications pathways established, and additional operations performed, to reconstruct a continuous data stream.

FIG. 16 illustrates example wireless communication pathways established according to the embodiment method 1500. A wireless device 1602 may establish a first wireless communication pathway with a server 1610 via a wireless connection 1606, such as a 3G connection, with a wireless network 1604, such as a 3G network. The wireless network 1604 may be in communication with the server 1610. The wireless device 1602 may also establish a second wireless communication pathway with the server 1610 via the wireless connection 1608, such as a 3G connection, with a wireless network 1604, such as a 3G network.

In operation, the wireless device 1602 may transmit/receive to/from the server the same continuous stream of frames via the first wireless communication pathway and the second wireless communication pathway. As discussed above, the Original Stream of frames 1, 2, 3, 4, 5, and 6 may be sent via the first and second wireless communication pathways via different transmission structures. In Stream 1 frames 1, 2, 3, 4, 5, and 6 may be sent in a contiguous structure in two packets, Packet 1.1 and Packet 1.2, respectively. Frames 1, 2, and 3 may be sent in Packet 1.1, and frames 4, 5, and 6, may be sent in Packet 1.2. In Stream 2 frames 1, 2, 3, 4, 5, and 6 may be sent in an interleaved structure in two packets, Packet 2.1 and Packet 2.2, respectively. Odd frames 1, 3, and 5 may be sent in Packet 2.1, and even frames 2, 4, and 6, may be sent in Packet 2.2. While the same continuous stream may be transmitted, due to various communication errors, such as both streams being blocked at the same time, different streams, Stream 1 and Stream 2, may be received. As an example, the second packet of each stream, Packet 1.2 and Packet 2.2, respectively, may be dropped due to both streams being blocked at the same time. In an embodiment, the server 1610 (or alternatively the wireless device 1602 if transmitted from the server 1610 to the wireless device 1602) receiving Stream 1 and Stream 2 may compare Stream 1 to Stream 2, and discard the duplicate frames 1 and 3 from Stream 2. The frames remaining 1, 2, 3, and 5 from the two streams, Stream 1 and Stream 2, may be combined to reconstruct as much of the original data stream as possible. In this manner, the reconstructed stream may include frames 1, 2, 3, and 5. While not the full original data stream, the reconstructed stream includes frames (i.e., frame 5) which would have been lost if the both streams had used the same transmission structure. In this manner, even though both communication pathways may be blocked at the same time, the number of lost frames may be reduced.

Figure 17:
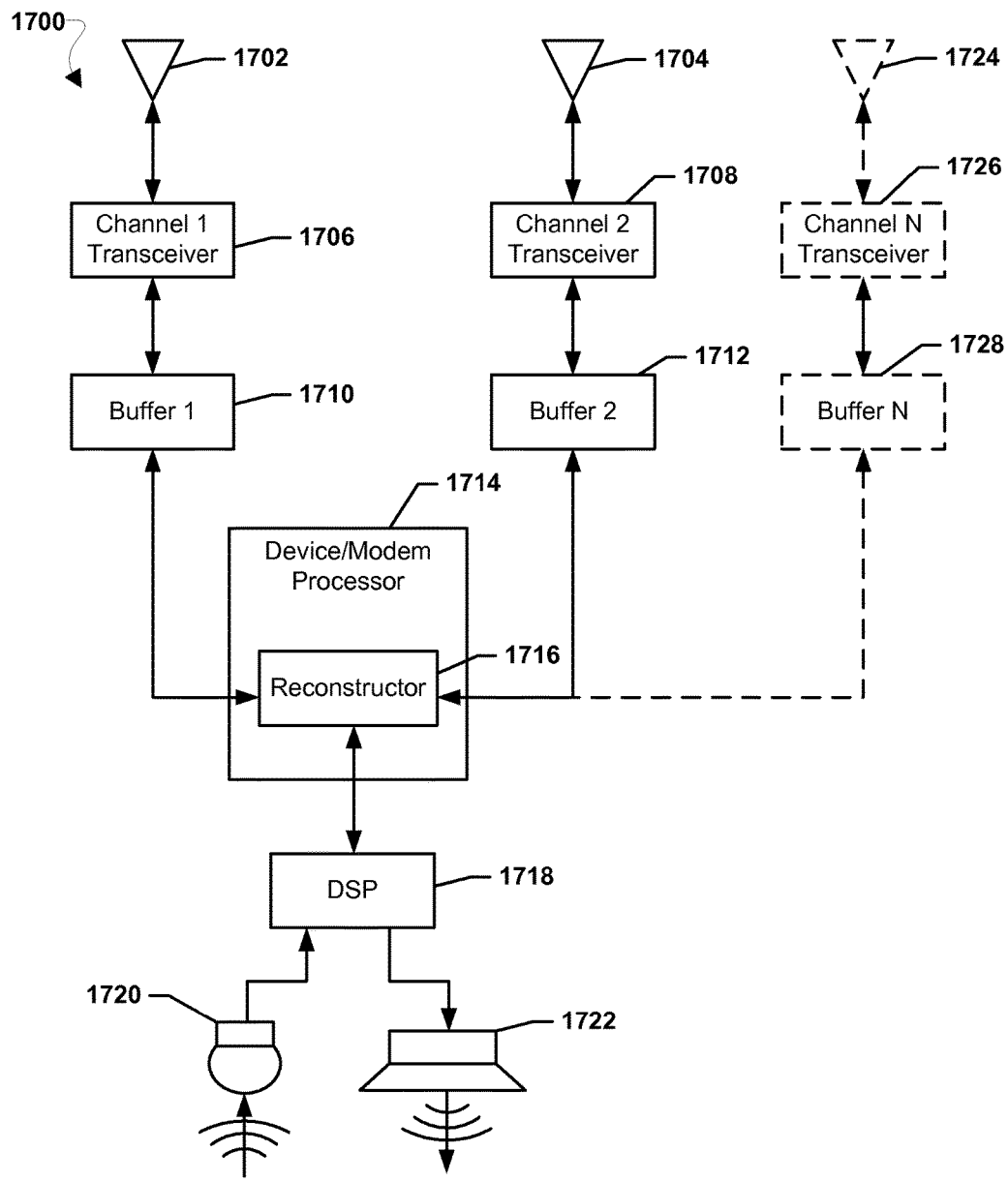
FIG. 17 is a component block diagram of an example wireless communication circuit suitable for use with the various embodiments.

The various embodiments may be implemented in any of a variety of wireless communication circuits, an example of which is illustrated in FIG. 17. In an embodiment, the wireless communication circuit 1700 may be part of a wireless device. In an embodiment, the wireless communication circuit 1700 may include a first antenna 1702 coupled to a first transceiver 1706. In operation, the first transceiver 1706 may be configured to transmit/receive over a channel in a wireless communications network, such as a 3G cellular network, via the first antenna 1702. The wireless communication circuit 1700 may also include a second antenna 1704 coupled to a second transceiver 1708. In operation, the second transceiver 1708 may be configured to transmit/receive over a channel in a wireless communications network via the second antenna 1704, different from the channel of the first transceiver 1706. The first transceiver 1706 and second transceiver 1708 may be coupled to buffers 1710, 1712, respectively. In an embodiment, the buffers 1710, 1712 may be memory locations in which portions of the data streams transmitted/received via the transceivers 1706, 1708 may be stored before/after transmission/reception. In an embodiment, the buffer level in buffers 1710, 1712 may be set independent of each other and may change dynamically based on the time delay difference in data streams transmitted/received via the transceivers 1706, 1708. As an example, if the first data stream received via the first antenna 1702 and the first transceiver 1706 is 100 milliseconds ahead in the timeline than the second data stream received via the second antenna 1704 and the second transceiver 1708, buffer 1710 may add 100 milliseconds of buffering to the first data stream to align the timelines. In this manner, the buffers 1710, 1712 may enable de-jittering of the data streams when the data streams transmitted/received by the do not align in time.

The buffers 1710, 1712 may be coupled to a reconstructor 1716. In an embodiment, the reconstructor 1716 may be a circuit which may be part of the device/modem processor 1714. In another embodiment, the reconstructor 1716 may be an application executed by the device/modem processor 1714. The reconstructor 1716 may be coupled to a digital signal processor ("DSP") 1718 and may send/receive data streams to/from the DSP 1718. In operation, when receiving audio data from the first buffer 1710 and the second buffer 1712, the reconstructor 1716 may reconstruct the continuous stream of audio data using the audio data received from either or both of the first buffer 1710 and the second buffer 1712 and send the reconstructed audio data to the DSP 1718. When receiving audio data from the DSP 1718, the reconstructor 1716 may send the same audio data to both the first buffer 1710 and the second buffer 1712 for transmission from the first transceiver 1706 via the first antenna 1702 and the second transceiver 1708 via the second antenna 1704. The DSP 1718 may be coupled to a microphone 1720 and a speaker 1722. In operation the DSP 1718 may receive audio data from the reconstructor 1716 and convert the data to audio signals for output by the speaker 1722. The DSP 1718 may also receive audio signals from the microphone 1720 convert the audio signals to continuous stream of audio data sent to the reconstructor 1716.

In an optional embodiment, any additional number N antennas 1724, transceivers 1726, and buffers 1728 may be added to the communication circuit 1700 and coupled to the reconstructor 1716. The reconstructor 1716 may send the same data to the N buffers 1728 as to buffers 1710, 1712, and may reconstruct the continuous stream of audio data using audio data received from one or more of the first buffer 1710, second buffer 1712, or N buffers 1728. In this manner, more than two, such as three, four, five, or more, redundant streams of data may be transmitted/received to improve data transmission reliability.

Figure 18:
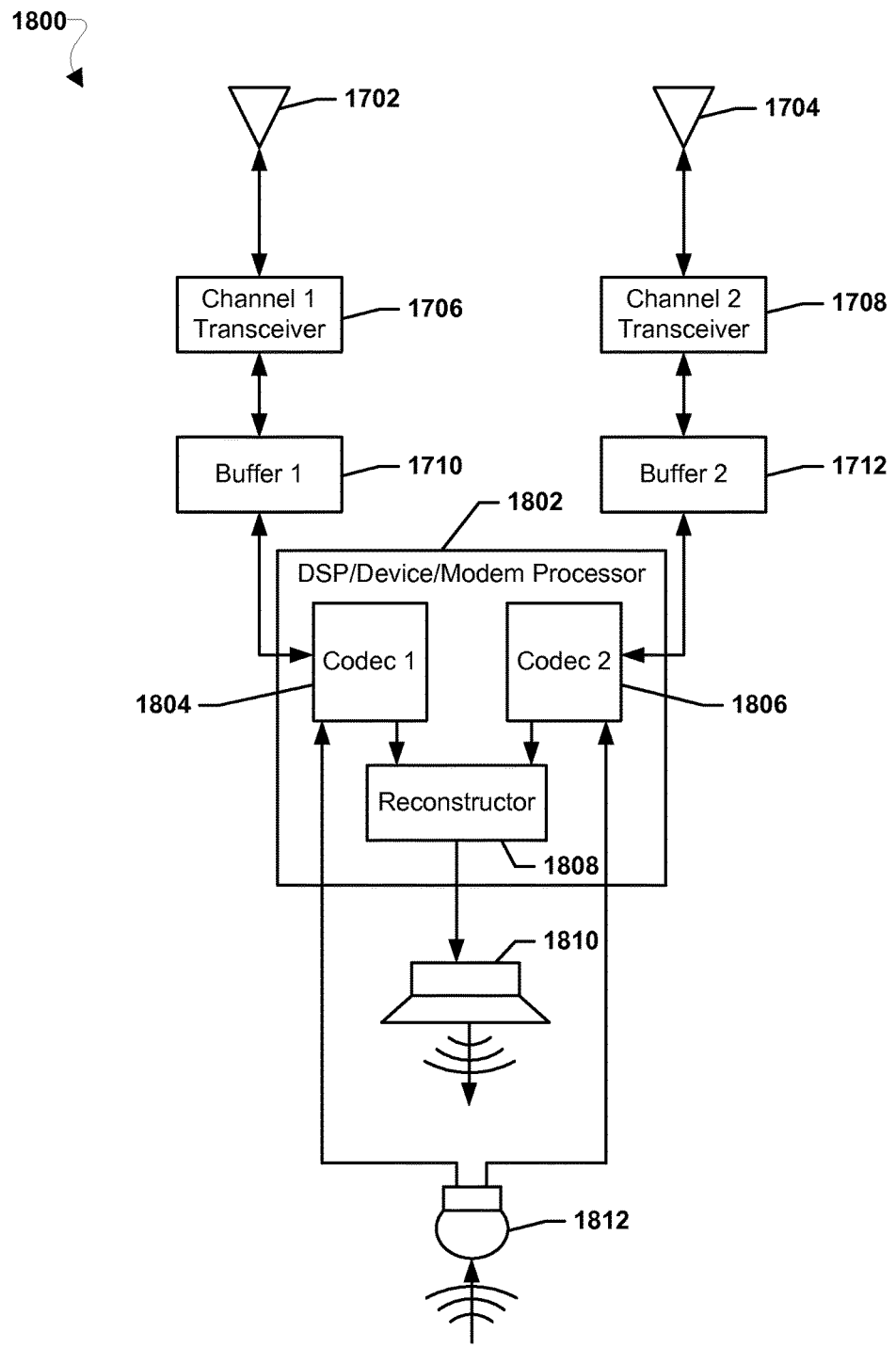
FIG. 18 is a component block diagram of a second example wireless communication circuit suitable for use with the various embodiments.

FIG. 18 illustrates a wireless communication circuit 1800 similar to wireless communication circuit 1700 described above with reference to FIG. 17, except that wireless communication circuit 1800 may use different codecs 1804, 1806 for transmission/reception of data via the first buffer 1710, transceiver 1706, and antenna 1702 and transmission/reception of data via the second buffer 1712, transceiver 1708, and antenna 1704. The first buffer 1710 may be coupled to the first codec 1804. As an example the first codec may be a high rate codec with a high sampling rate. The second buffer 1712 may be coupled to the second codec 1806 which may be a low rate codec with a lower sampling rate than the first codec 1804. In an embodiment, the codecs 1804, 1806 and/or reconstructor 1808 may be circuits operating as part of a DSP/device/modem processor 1802. In another embodiment, the codecs 1804, 1806 and/or reconstructor 1808 may be applications executed by a DSP/device/modem processor 1802. The codecs 1804, 1806 may be coupled to the microphone 1812 and may receive audio signals from the microphone 1812. The codecs 1804, 1806 may also be coupled to the reconstructor 1808, and the reconstructor 1808 may be coupled to the speaker 1810.

In operation audio signals received by the microphone 1812 may be sent to the codecs 1804, 1806 in parallel and each codec 1804, 1806 may sample the audio signals and send audio data to its respective buffer 1710, 1712 for transmission by the respective transceivers 1706, 1708 and antennas 1702, 1704. The codecs 1804, 1806 may receive audio data from their respective buffers 1710, 1712 and send the audio data to the reconstructor 1808 which may reconstruct the continuous stream of audio data using the audio data received from either or both of the first codec 1804 and the second codec 1806. The reconstructed audio data may be output as audio signals to the speaker 1810. In an embodiment, the reconstructor 1808 may default to outputting the audio data from the codec 1804, 1806 with the highest sampling rate, and may only output data from the lower sampling rate codec when the output from the first codec is not available and/or below a quality threshold. In this manner, the step down to the lower sampling rate codec may enable the call to continue with a lower quality audio.

Figure 19:
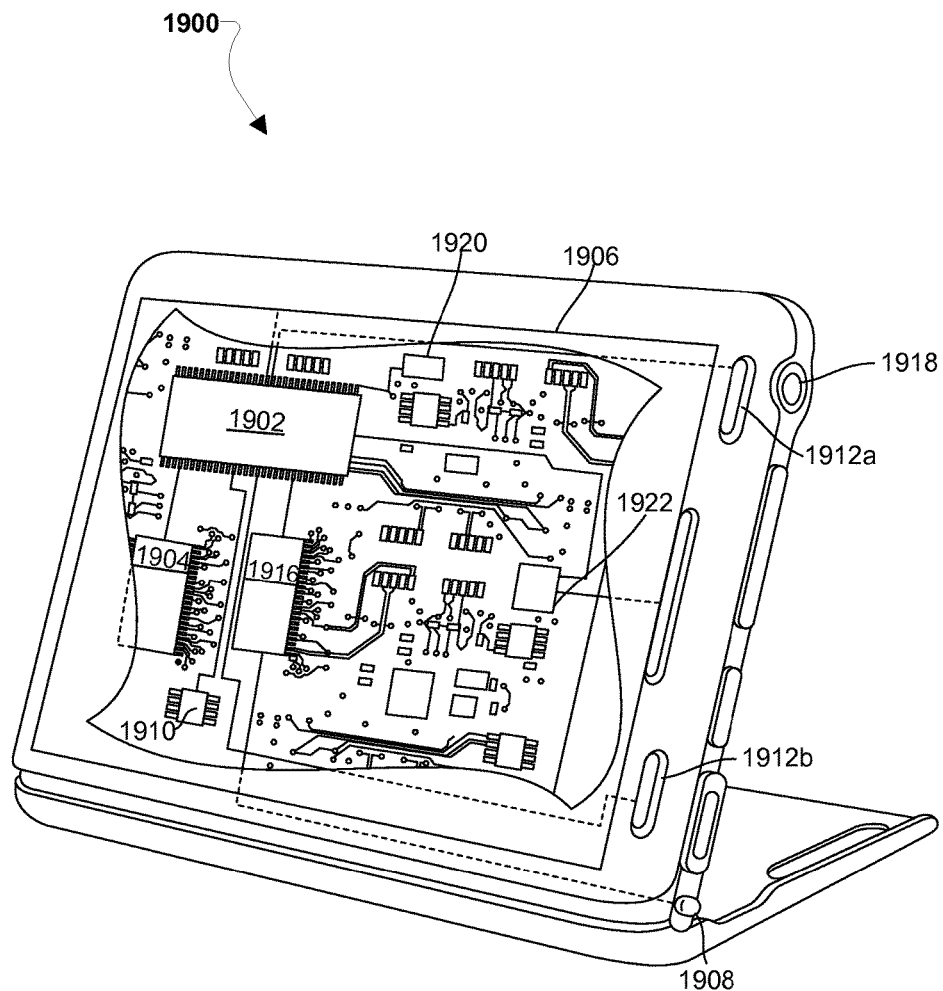
FIG. 19 is a component diagram of an example mobile device suitable for use with the various embodiments.

The various embodiments may be implemented in any of a variety of wireless devices, an example of which is illustrated in FIG. 19. For example, the wireless device 1900 may include a processor 1902 coupled to internal memories 1904 and 1910. Internal memories 1904 and 1910 may be volatile or non-volatile memories, and may also be secure and/or encrypted memories, or unsecure and/or unencrypted memories, or any combination thereof. The processor 1902 may also be coupled to a touch screen display 1906, such as a resistive-sensing touch screen, capacitive-sensing touch screen infrared sensing touch screen, or the like. Additionally, the display of the wireless device 1900 need not have touch screen capability. Additionally, the wireless device 1900 may have one or more antenna 1908 for sending and receiving electromagnetic radiation that may be connected to one or more a wireless data link and/or cellular telephone transceiver 1916 coupled to the processor 1902. The wireless device 1900 may also include physical buttons 1912a and 1912b for receiving user inputs. The wireless device 1900 may also include a power button 1918 for turning the wireless device 1900 on and off. The wireless device 1900 may also include a battery 1920 coupled to the processor 1902. The wireless device 1900 may also include a position sensor 1922, such as a GPS receiver, coupled to the processor 1902.

Figure 20:
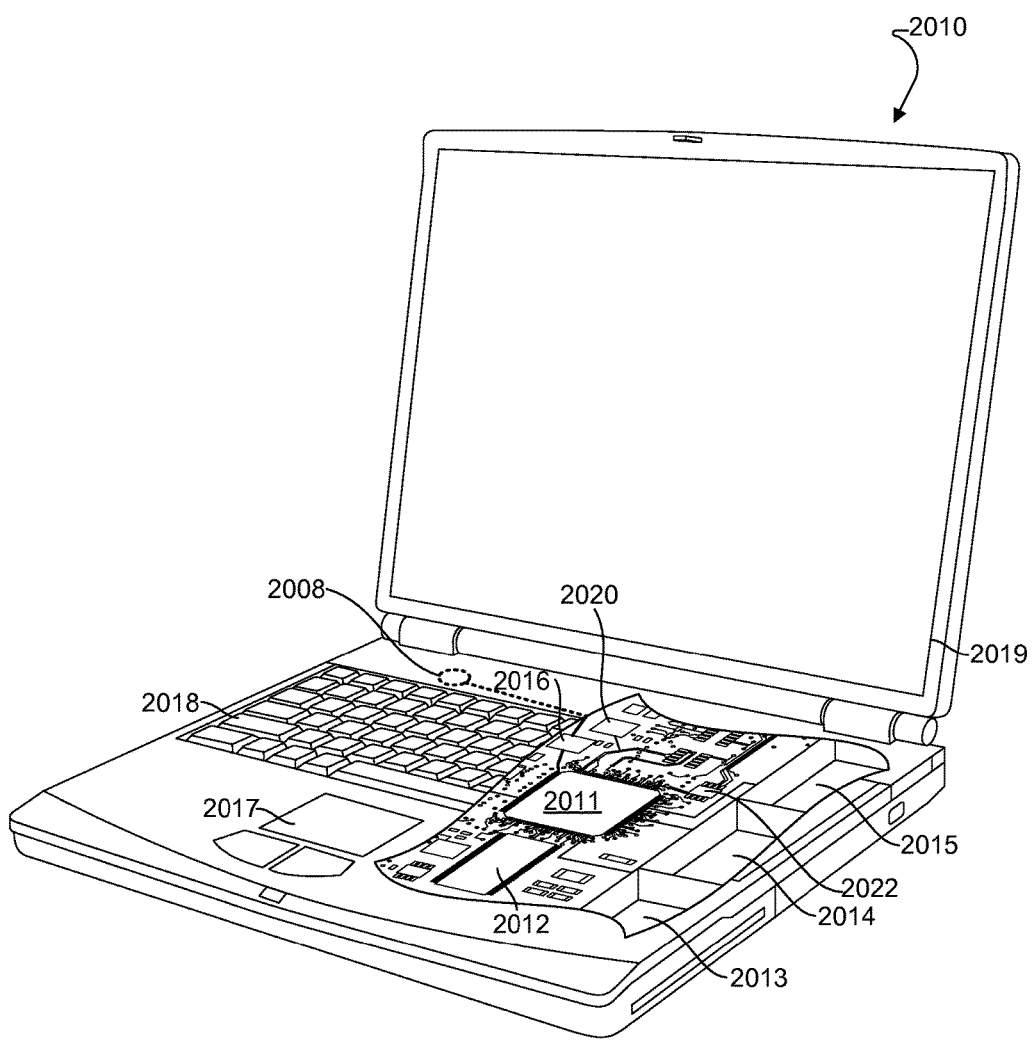
FIG. 20 is a component diagram of another example mobile device suitable for use with the various embodiments.

The various embodiments described above may also be implemented within a variety of personal computing devices, such as a laptop computer 2010 as illustrated in FIG. 20. Many laptop computers include a touch pad touch surface 2017 that serves as the computer's pointing device, and thus may receive drag, scroll, and flick gestures similar to those implemented on mobile computing devices equipped with a touch screen display and described above. A laptop computer 2010 will typically include a processor 2011 coupled to volatile memory 2012 and a large capacity nonvolatile memory, such as a disk drive 2013 of Flash memory. The laptop computer 2010 may also include a floppy disc drive 2014 and a compact disc (CD) drive 2015 coupled to the processor 2011. The laptop computer 2010 may also include a number of connector ports coupled to the processor 2011 for establishing data connections or receiving external memory devices, such as a USB or FireWire® connector sockets, or other network connection circuits for coupling the processor 2011 to a network. In a notebook configuration, the computer housing includes the touchpad 2017, the keyboard 2018, and the display 2019 all coupled to the processor 2011. The laptop computer 2010 may also include a battery 2020 coupled to the processor 2011. The laptop computer 2010 may also include a position sensor 2022, such as a GPS receiver, coupled to the processor 2011. Additionally, the laptop computer 2010 may have one or more antenna 2008 for sending and receiving electromagnetic radiation that may be connected to one or more a wireless data link and/or cellular telephone transceiver 2016 coupled to the processor 2011. Other configurations of the computing device may include a computer mouse or trackball coupled to the processor (e.g., via a USB input) as are well known, which may also be used in conjunction with the various embodiments.

Figure 21:
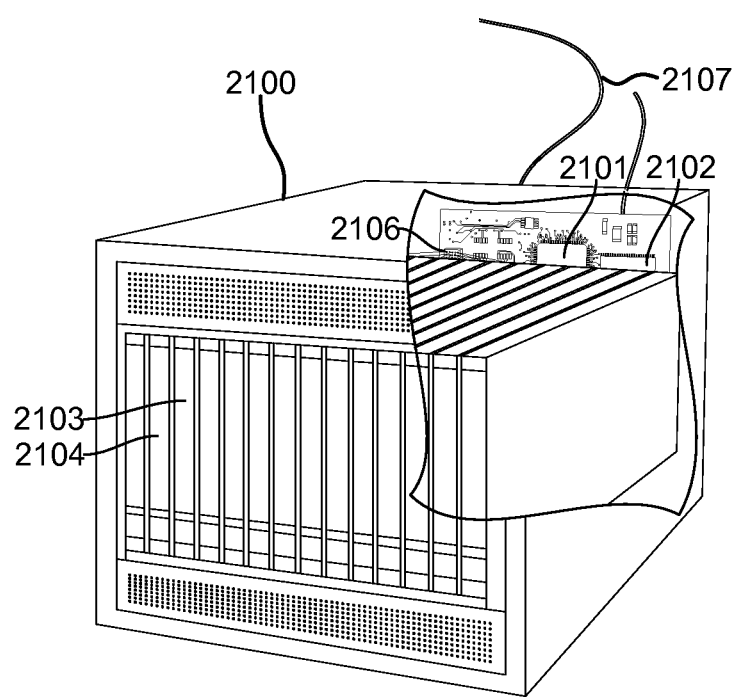
FIG. 21 is a component diagram of an example server suitable for use with the various embodiments

The various embodiments may also be implemented on any of a variety of commercially available server devices, such as the server 2100 illustrated in FIG. 21. Such a server 2100 typically includes a processor 2101 coupled to volatile memory 2102 and a large capacity nonvolatile memory, such as a disk drive 2103. The server 2100 may also include a floppy disc drive, compact disc (CD) or DVD disc drive 2104 coupled to the processor 2101. The server 2100 may also include network access ports 2106 coupled to the processor 2101 for establishing network interface connections with a network 2107, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 1902, 2011, and 2101 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1904, 1910, 2012, 2013, 2102, and 2103 before they are accessed and loaded into the processors 1902, 2011, and 2101. The processors 1902, 2011, and 2101 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1902, 2011, and 2101 including internal memory or removable memory plugged into the device and memory within the processor 1902, 2011, and 2101 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory processor-readable medium. The steps of a method or algorithm disclosed herein may be embodied in a processor-executable software module which may reside on a non-transitory computer-readable storage medium. Tangible, non-transitory processor-readable storage media may be any available media that may be accessed by a processor of a computer, mobile computing device or a wireless communication device. By way of example, and not limitation, such non-transitory processor-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory processor-readable media. Additionally, the operations of a method or algorithm may reside as one or any combination or set of codes and/or instructions on a tangible, non-transitory machine readable medium and/or non-transitory processor-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for maintaining call quality in a wireless communication system, comprising:
    establishing a first wireless communication pathway in the wireless communication system between a first wireless device and a second device of the wireless communication system;
    determining, at the first wireless device, that a trigger event to establish one or more additional wireless communication pathways has occurred, the trigger event associated with multiple different criteria including at least a user input received at the first wireless device indicating that a current call on the wireless communication system is a high priority call in combination with a prediction, by the first wireless device, that the first wireless device will enter a limited coverage area in the wireless communication system associated with low quality reception via the first wireless communication pathway;
    displaying, on the first wireless device, a user approval prompt in response to the first wireless device determining that the trigger event has occurred, wherein the user approval prompt includes information indicating that an expenditure of additional resources is required to establish the one or more additional wireless communication pathways;
    establishing, in addition to the first wireless communication pathway, a second wireless communication pathway in the wireless communication system between the first wireless device and the second device in response to receiving a user approval indication approving the expenditure of the additional resources, wherein the first and second wireless communication pathways are different; and
    transmitting a continuous data stream comprising the same original data stream from the first wireless device to the second device via both the first and second wireless communication pathways in a manner that enables the second device to receive and reconstruct the complete original data stream from the continuous data stream transmitted via either or both of the first and second wireless communication pathways.

2. The method of claim 1, further comprising:
    transmitting the continuous data stream on both the first and second wireless communication pathways as a series of indexed data packets, wherein the second device uses the series of indexed data packets to recover a more complete set of the transmitted data packets than the second device received over either of the first and second wireless communication pathways.

3. The method of claim 1, further comprising:
    transmitting the continuous data stream on both the first and second wireless communication pathways as a series of indexed data packets, wherein the second device uses the series of indexed data packets to discard redundant data packets received over the first and second wireless communication pathways.

4. The method of claim 1, wherein the second wireless communication pathway is established for only a portion of a time that the first wireless communication pathway is established.

5. The method of claim 4, wherein predicting that the first wireless device will enter the limited coverage area associated with the low quality reception via the first wireless communication pathway comprises:
  determining, at the first wireless device, a likely travel path for the first wireless device based at least in part on location and velocity vector information received from one or more sensors on the first wireless device; and
  predicting that the first wireless device will enter the limited coverage area associated with the low quality reception via the first wireless communication pathway based on a comparison between the likely travel path and a cellular coverage map indicating that the first wireless device will enter or is approaching the limited coverage area in the wireless communication system.

6. The method of claim 5, wherein the limited coverage area associated with the low quality reception via the first wireless communication pathway is determined based on a user of the first wireless device having previously designated the limited coverage area as having poor call quality.

7. The method of claim 4, further comprising:
  terminating the second wireless communication pathway between the first wireless device and the second device in response to an end trigger event.

8. The method of claim 1, further comprising determining, at the first wireless device, call quality over the first wireless communication pathway, wherein the multiple different criteria associated with the trigger event further include the call quality over the first wireless communication pathway falling below a threshold value.

9. The method of claim 1,
  wherein the required expenditure of additional resources indicated in the user approval prompt is related to one or more of a cost or data usage to establish the second wireless communication pathway.

10. The method of claim 1, wherein the user approval prompt further includes information related to one or more of device setting information, caller IDs, call quality information, time of day, day of the week, power usage, device battery level information, or call type information.

11. The method of claim 1, wherein the first and second wireless communication pathways are established using different wireless communication protocols.

12. The method of claim 1, wherein the first and second wireless communication pathways are established using different antennas on the first wireless device.

13. The method of claim 1, wherein the second wireless communication pathway is established, at least in part, across an additional wireless device associated with a user of the first wireless device.

14. The method of claim 1, wherein the first and second wireless communication pathways are established over different wireless networks within the wireless communication system.

15. The method of claim 1, wherein the first and second wireless communication pathways are established using different codecs on the first wireless device.

16. The method of claim 1, further comprising transmitting the continuous data stream on both the first and second wireless communication pathways using different transmission structures.

17. The method of claim 1, wherein the second device is a server within the wireless communication system, the method further comprising:
  establishing a third wireless communication pathway between the server and a second wireless device;
  sending a dual communication pathway request from the server to the second wireless device requesting the second wireless device to establish a dual communication pathway with the server;
  determining whether the second wireless device accepted or rejected the dual communication pathway request; and
  if the dual communication pathway request is accepted by the second wireless device:
    establishing a fourth wireless communication pathway between the server and the second wireless device; and
    transmitting the complete original data stream from the server to the second wireless device via both the third and fourth wireless communication pathways in a manner that enables the second wireless device to receive and reconstruct the complete original data stream via either or both of the third and fourth wireless communication pathways.

18. The method of claim 17, wherein determining whether the second wireless device accepted or rejected the dual communication pathway request is based on one or more of a user input, device setting information, caller IDs, call quality information, time of day, day of the week, data pricing information, power usage, device battery level information, data usage information, or call type information.

19. A wireless communication system, comprising:
  means for establishing a first wireless communication pathway in the wireless communication system between a first wireless device and a second device of the wireless communication system;
  means for determining, at the first wireless device, that a trigger event to establish one or more additional wireless communication pathways has occurred, the trigger event associated with multiple different criteria including at least a user input received at the first wireless device indicating that a current call on the wireless communication system is a high priority call in combination with a prediction, by the first wireless device, that the first wireless device will enter a limited coverage area in the wireless communication system associated with low quality reception via the first wireless communication pathway;
  means for displaying, on the first wireless device, a user approval prompt in response to the trigger event, wherein the user approval prompt includes information indicating that an expenditure of additional resources is required to establish the one or more additional wireless communication pathways;
  means for establishing, in addition to the first wireless communication pathway, a second wireless communication pathway in the wireless communication system between the first wireless device and the second device in response to receiving a user approval indication approving the expenditure of the additional resources, wherein the first and second wireless communication pathways are different; and
  means for transmitting a continuous data stream comprising the same original data stream from the first wireless device to the second device via both the first and second wireless communication pathways in a manner that enables the second device to receive and reconstruct the complete original data stream from the continuous data stream transmitted via either or both of the first and second wireless communication pathways.

20. The wireless communication system of claim 19, further comprising:
  means for transmitting the continuous data stream on both the first and second wireless communication pathways as a series of indexed data packets, wherein the second device uses the series of indexed data packets to recover a more complete set of the transmitted data packets than the second device received over either of the first and second wireless communication pathways.

21. The wireless communication system of claim 19, further comprising:
    means for transmitting the continuous data stream on both the first and second wireless communication pathways as a series of indexed data packets, wherein the second device uses the series of indexed data packets to discard redundant data packets received over the first and second wireless communication pathways.

22. The wireless communication system of claim 19, wherein the second wireless communication pathway is established for only a portion of a time that the first wireless communication pathway is established.

23. The wireless communication system of claim 22, wherein the means for determining that the trigger event has occurred comprises:
    means for determining, at the first wireless device, a likely travel path for the first wireless device based at least in part on location and velocity vector information received from one or more sensors on the first wireless device; and
    means for predicting that the first wireless device will enter the limited coverage area associated with the low quality reception via the first wireless communication pathway based on a comparison between the likely travel path and a cellular coverage map indicating that the first wireless device will enter or is approaching the limited coverage area in the wireless communication system.

24. The wireless communication system of claim 23, wherein the limited coverage area associated with the low quality reception via the first wireless communication pathway is determined based on a user of the first wireless device having previously designated the limited coverage area as having poor call quality.

25. The wireless communication system of claim 19, further comprising means for determining, at the first wireless device, call quality over the first wireless communication pathway, wherein the multiple different criteria associated with the trigger event further include the call quality over the first wireless communication pathway falling below a threshold value.

26. The wireless communication system of claim 19, wherein the required expenditure of additional resources indicated in the user approval prompt is related to one or more of a cost or data usage to establish the second wireless communication pathway.

27. The wireless communication system of claim 19, wherein the user approval prompt further includes information related to one or more of device setting information, caller IDs, call quality information, time of day, day of the week, power usage, device battery level information, or call type information.

28. The wireless communication system of claim 19, wherein the first and second wireless communication pathways are established using different wireless communication protocols.

29. The wireless communication system of claim 19, wherein the first and second wireless communication pathways are established using different antennas on the first wireless device.

30. The wireless communication system of claim 19, wherein the second wireless communication pathway is established, at least in part, across an additional wireless device associated with a user of the first wireless device.

31. The wireless communication system of claim 19, wherein the first and second wireless communication pathways are established over different wireless networks within the wireless communication system.

32. The wireless communication system of claim 19, wherein the first and second wireless communication pathways are established using different codecs on the first wireless device.

33. The wireless communication system of claim 19, further comprising means for transmitting the continuous data stream on both the first and second wireless communication pathways using different transmission structures.

34. The wireless communication system of claim 19, wherein the second device is a server within the wireless communication system, the wireless communication system further comprising:
    means for establishing a third wireless communication pathway between the server and a second wireless device;
    means for sending a dual communication pathway request from the server to the second wireless device requesting the second wireless device to establish a dual communication pathway with the server;
    means for determining whether the second wireless device accepted or rejected the dual communication pathway request; and
    if the dual communication pathway request is accepted by the second wireless device:
        means for establishing a fourth wireless communication pathway between the server and the second wireless device; and
        means for transmitting the complete original data stream from the server to the second wireless device via both the third and fourth wireless communication pathways in a manner that enables the second wireless device to receive and reconstruct the complete original data stream via either or both of the third and fourth wireless communication pathways.

35. The wireless communication system of claim 34, wherein whether the second wireless device accepted or rejected the dual communication pathway request is determined based on one or more of a user input, device setting information, caller IDs, call quality information, time of day, day of the week, data pricing information, power usage, device battery level information, data usage information, or call type information.

36. A wireless device, comprising:
    a display;
    a memory;
    a transceiver for interfacing with a wireless communication system; and
    a processor coupled to the display, the memory, and the transceiver, wherein the processor is configured with processor-executable instructions to:
        establish a first wireless communication pathway in the wireless communication system with a second device of the wireless communication system;
        determine that a trigger event to establish one or more additional wireless communication pathways has occurred, the trigger event associated with multiple different criteria including at least a user input received at the wireless device indicating that a current call on the wireless communication system is a high priority call in combination with a prediction at the wireless device that the wireless device will enter a limited coverage area in the wireless communication system associated with low quality reception via the first wireless communication pathway;

display a user approval prompt on the display in response to the trigger event, wherein the user approval prompt includes information indicating that an expenditure of additional resources is required to establish the one or more additional wireless communication pathways;

establish, in addition to the first wireless communication pathway, a second wireless communication pathway in the wireless communication system with the second device in response to a user approval indication approving the expenditure of the additional resources, wherein the first and second wireless communication pathways are different; and transmit a continuous data stream comprising the same original data stream to the second device via both the first and second wireless communication pathways in a manner that enables the second device to receive and reconstruct the complete original data stream from the continuous data stream transmitted via either or both of the first and second wireless communication pathways.

37. The wireless device of claim 36, wherein the processor is further configured with processor-executable instructions to transmit the continuous data stream on both the first and second wireless communication pathways as a series of indexed data packets.

38. The wireless device of claim 36, wherein the second wireless communication pathway is established for only a portion of a time that the first wireless communication pathway is established.

39. The wireless device of claim 36, wherein the processor is further configured with processor-executable instructions to:

determine a likely travel path for the wireless device based at least in part on location and velocity vector information received from one or more sensors on the wireless device; and predict that the wireless device will enter the limited coverage area associated with the low quality reception via the first wireless communication pathway based on a comparison between the likely travel path and a cellular coverage map indicating that the wireless device will enter or is approaching the limited coverage area in the wireless communication system.

40. The wireless device of claim 39, wherein the limited coverage area associated with the low quality reception via the first wireless communication pathway is determined based on a user of the wireless device having previously designated the limited coverage area as having poor call quality.

41. The wireless device of claim 36, wherein the processor is further configured with processor-executable instructions to determine call quality over the first wireless communication pathway, wherein the multiple different criteria associated with the trigger event further include the call quality over the first wireless communication pathway falling below a threshold value.

42. The wireless device of claim 36, wherein the required expenditure of additional resources indicated in the user approval prompt is related to one or more of a cost or data usage to establish the second wireless communication pathway.

43. The wireless device of claim 36, wherein the user approval prompt further includes information related to one or more of device setting information, caller IDs, call quality information, time of day, day of the week, power usage, device battery level information, or call type information.

44. The wireless device of claim 36, wherein the processor is further configured with processor-executable instructions to establish the first and second wireless communication pathways using different wireless communication protocols.

45. The wireless device of claim 36, wherein the processor is further configured with processor-executable instructions to establish the first and second wireless communication pathways using different antennas on the wireless device.

46. The wireless device of claim 36, wherein the processor is further configured with processor-executable instructions to establish the second wireless communication pathway, at least in part, across an additional wireless device associated with a user of the wireless device.

47. The wireless device of claim 36, wherein the processor is further configured with processor-executable instructions to establish the first and second wireless communication pathways over different wireless networks within the wireless communication system.

48. The wireless device of claim 36, wherein the processor is further configured with processor-executable instructions to establish the first and second wireless communication pathways using different codecs on the wireless device.

49. The wireless device of claim 36, wherein the processor is further configured with processor-executable instructions to transmit the continuous data stream on both the first and second wireless communication pathways using different transmission structures.

50. A non-transitory processor-readable medium having stored thereon processor-executable instructions configured to cause a wireless device processor within a wireless communication system to:

establish a first wireless communication pathway in the wireless communication system with a second device of the wireless communication system;

determine that a trigger event to establish one or more additional wireless communication pathways has occurred, the trigger event associated with multiple different criteria including at least a user input received at the wireless device processor indicating that a current call on the wireless communication system is a high priority call in combination with a prediction at the wireless device processor that the wireless device processor will enter a limited coverage area in the wireless communication system associated with low quality reception via the first wireless communication pathway;

display a user approval prompt in response to the trigger event, wherein the user approval prompt includes information indicating that an expenditure of additional resources is required to establish the one or more additional wireless communication pathways;

establish, in addition to the first wireless communication pathway, a second wireless communication pathway in the wireless communication system with the second device in response to a user approval indication approving the expenditure of the additional resources, wherein the first and second wireless communication pathways are different; and transmit a continuous data stream comprising the same original data stream to the second device via both the first and second wireless communication pathways in a manner that enables the second device to receive and reconstruct the complete original data stream from the continuous data stream transmitted via either or both of the first and second wireless communication pathways.

51. The non-transitory processor-readable medium of claim 50, wherein the stored processor-executable instructions are configured to cause the wireless device processor to transmit the continuous data stream on both the first and second wireless communication pathways as a series of indexed data packets.

52. The non-transitory processor-readable medium of claim 50, wherein the stored processor-executable instructions are configured to cause the wireless device processor to establish the second wireless communication pathway for only a portion of a time that the first wireless communication pathway is established.

53. The non-transitory processor-readable medium of claim 50, wherein the stored processor-executable instructions are configured to cause the wireless device processor to:
determine a likely travel path for the wireless device processor based at least in part on location and velocity vector information received from one or more sensors on the wireless device processor; and
predict that the wireless device processor will enter the limited coverage area associated with the low quality reception via the first wireless communication pathway based on a comparison between the likely travel path and a cellular coverage map indicating that the wireless device processor will enter or is approaching the limited coverage area in the wireless communication system.

54. The non-transitory processor-readable medium of claim 53, wherein the limited coverage area associated with the low quality reception via the first wireless communication pathway is determined based on a user of the wireless device processor having previously designated the limited coverage area as having poor call quality.

55. The non-transitory processor-readable medium of claim 50, wherein the stored processor-executable instructions are configured to cause the wireless device processor to determine call quality over the first wireless communication pathway, wherein the multiple different criteria associated with the trigger event further include the call quality over the first wireless communication pathway falling below a threshold value.

56. The non-transitory processor-readable medium of claim 50,
wherein the required expenditure of additional resources indicated in the user approval prompt is related to one or more of a cost or data usage to establish the second wireless communication pathway.

57. The non-transitory processor-readable medium of claim 50, wherein the user approval prompt further includes information related to one or more of device setting information, caller IDs, call quality information, time of day, day of the week, power usage, device battery level information, or call type information.

58. The non-transitory processor-readable medium of claim 50, wherein the stored processor-executable instructions are configured to cause the wireless device processor to establish the first and second wireless communication pathways using different wireless communication protocols.

59. The non-transitory processor-readable medium of claim 50, wherein the stored processor-executable instructions are configured to cause the wireless device processor to establish the first and second wireless communication pathways using different antennas on the wireless device processor.

60. The non-transitory processor-readable medium of claim 50, wherein the stored processor-executable instructions are configured to cause the wireless device processor to establish the second wireless communication pathway, at least in part, across an additional wireless device associated with a user of the wireless device processor.

61. The non-transitory processor-readable medium of claim 50, wherein the stored processor-executable instructions are configured to cause the wireless device processor to establish the first and second wireless communication pathways over different wireless networks within the wireless communication system.

62. The non-transitory processor-readable medium of claim 50, wherein the stored processor-executable instructions are configured to cause the wireless device processor to establish the first and second wireless communication pathways using different codecs on the wireless device processor.

63. The non-transitory processor-readable medium of claim 50, wherein the stored processor-executable instructions are configured to cause the wireless device processor to transmit the continuous data stream on both the first and second wireless communication pathways using different transmission structures.

64. A wireless device, comprising:
means for establishing a first wireless communication pathway in a wireless communication system with a second device of the wireless communication system;
means for determining that a trigger event to establish one or more additional wireless communication pathways has occurred, the trigger event associated with multiple different criteria including at least a user input received at the wireless device indicating that a current call on the wireless communication system is a high priority call in combination with a prediction, by the wireless device, that the wireless device will enter a limited coverage area in the wireless communication system associated with low quality reception via the first wireless communication pathway;
means for displaying a user approval prompt in response to the trigger event, wherein the user approval prompt includes information indicating that an expenditure of additional resources is required to establish the one or more additional wireless communication pathways;
means for establishing, in addition to the first wireless communication pathway, a second wireless communication pathway in the wireless communication system with the second device in response to a user approval indication approving the expenditure of the additional resources, wherein the first and second wireless communication pathways are different; and
means for transmitting a continuous data stream comprising the same original data stream to the second device via both the first and second wireless communication pathways in a manner that enables the second device to receive and reconstruct the complete original data stream from the continuous data stream transmitted via either or both of the first and second wireless communication pathways.

65. The wireless device of claim 64, further comprising means for transmitting the continuous data stream on both the first and second wireless communication pathways as a series of indexed data packets.

66. The wireless device of claim 64, wherein the second wireless communication pathway is established for only a portion of a time that the first wireless communication pathway is established.

67. The wireless device of claim 64, wherein the means for determining that the trigger event has occurred comprises:
means for determining, at the wireless device, a likely travel path for the wireless device based at least in part on location and velocity vector information received from one or more sensors on the wireless device; and
means for predicting that the wireless device will enter the limited coverage area associated with the low quality reception via the first wireless communication pathway based on a comparison between the likely travel path and a cellular coverage map indicating that the wireless device will enter or is approaching the limited coverage area in the wireless communication system.

68. The wireless device of claim 67, wherein the limited coverage area associated with the low quality reception via the first wireless communication pathway is determined based on a user of the wireless device having previously designated the limited coverage area as having poor call quality.

69. The wireless device of claim 64, further comprising means for determining call quality over the first wireless communication pathway, wherein the multiple different criteria associated with the trigger event further include the call quality over the first wireless communication pathway falling below a threshold value.

70. The wireless device of claim 64,
wherein the required expenditure of additional resources indicated in the user approval prompt is related to one or more of a cost or data usage to establish the second wireless communication pathway.

71. The wireless device of claim 64, wherein the user approval prompt further includes information related to one or more of device setting information, caller IDs, call quality information, time of day, day of the week, power usage, device battery level information, or call type information.

72. The wireless device of claim 64, wherein the first and second wireless communication pathways are established using different wireless communication protocols.

73. The wireless device of claim 64, wherein the first and second wireless communication pathways are established using different antennas on the wireless device.

74. The wireless device of claim 64, wherein the second wireless communication pathway is established, at least in part, across an additional wireless device associated with a user of the wireless device.

75. The wireless device of claim 64, wherein the first and second wireless communication pathways are established over different wireless networks within the wireless communication system.

76. The wireless device of claim 64, wherein the first and second wireless communication pathways are established using different codecs on the wireless device.

77. The wireless device of claim 64, further comprising means for transmitting the continuous data stream on both the first and second wireless communication pathways using different transmission structures.

78. A server for use within a wireless communication system, comprising:
a memory;
a transceiver for interfacing with the wireless communication system; and
a processor coupled to the memory and the transceiver, wherein the processor is configured with processor-executable instructions to:
establish a first wireless communication pathway in the wireless communication system between the server and a first wireless device;
establish, in addition to the first wireless communication pathway, a second wireless communication pathway in the wireless communication system between the server and the first wireless device, wherein the first and second wireless communication pathways are different, and wherein the second wireless communication pathway is initiated at the first wireless device based on a user approving an expenditure of additional resources to establish the second wireless communication pathway following a trigger event associated with multiple different criteria, the multiple different criteria including at least a user input received at the first wireless device indicating that a current call on the wireless communication system is a high priority call in combination with a prediction at the first wireless device that the first wireless device will enter a limited coverage area in the wireless communication system associated with low quality reception via the first wireless communication pathway;
receive a continuous data stream comprising the same original data stream from the first wireless device via both the first and second wireless communication pathways; and
reconstruct the complete original data stream from the continuous data stream received via either or both of the first and second wireless communication pathways.

79. The server of claim 78, wherein the processor is further configured with processor-executable instructions to:
receive the continuous data stream on both the first and second wireless communication pathways as a series of indexed data packets; and
use the series of indexed data packets to recover a more complete set of the data packets than received over either of the first and second wireless communication pathways.

80. The server of claim 78, wherein the processor is further configured with processor-executable instructions to:
receive the continuous data stream on both the first and second wireless communication pathways as a series of indexed data packets; and
use the series of indexed data packets to discard received redundant packets.

81. The server of claim 78, wherein the processor is further configured with processor-executable instructions to:
establish a third wireless communication pathway between the server and a second wireless device;
send a dual communication pathway request from the server to the second wireless device requesting the second wireless device to establish a dual communication pathway with the server;
determine whether the dual communication pathway request is accepted or rejected by the second wireless device; and
if the dual communication pathway request is accepted by the second wireless device:
establish a fourth wireless communication pathway between the server and the second wireless device; and transmit the complete original data stream from the server to the second wireless device via both the third and fourth wireless communication pathways in a manner that enables the second wireless device to receive and reconstruct the complete original data stream via either or both of the third and fourth wireless communication pathways.

82. A non-transitory processor-readable medium having stored thereon server-executable instructions configured to cause a server within a wireless communication system to:
establish a first wireless communication pathway in the wireless communication system between the server and a first wireless device;
establish, in addition to the first wireless communication pathway, a second wireless communication pathway in the wireless communication system between the server and the first wireless device, wherein the first and second wireless communication pathways are different, and wherein the second wireless communication pathway is initiated at the first wireless device based on a user approving an expenditure of additional resources to establish the second wireless communication pathway following a trigger event associated with multiple different criteria, the multiple different criteria including at least a user input received at the first wireless device indicating that a current call on the wireless communication system is a high priority call in combination with a prediction at the first wireless device that the first wireless device will enter a limited coverage area in the wireless communication system associated with low quality reception via the first wireless communication pathway;
receive a continuous data stream comprising the same original data stream from the first wireless device via both the first and second wireless communication pathways; and
reconstruct the complete original data stream from the continuous data stream received via either or both of the first and second wireless communication pathways.

83. The non-transitory processor-readable medium of claim 82, wherein the stored server-executable instructions are further configured to cause the server to:
receive the continuous data stream on both the first and second wireless communication pathways as a series of indexed data packets; and
use the series of indexed data packets to recover a more complete set of the data packets than received over either of the first and second wireless communication pathways.

84. The non-transitory processor-readable medium of claim 82, wherein the stored server-executable instructions are further configured to cause the server to:
receive the continuous data stream on both the first and second wireless communication pathways as a series of indexed data packets; and
use the series of indexed data packets to discard received redundant packets.

85. The non-transitory processor-readable medium of claim 82, wherein the stored server-executable instructions are further configured to cause the server to:
establish a third wireless communication pathway between the server and a second wireless device;
send a dual communication pathway request from the server to the second wireless device requesting the second wireless device to establish a dual communication pathway with the server;
determine whether the dual communication pathway request is accepted or rejected by the second wireless device; and
if the dual communication pathway request is accepted by the second wireless device:
establish a fourth wireless communication pathway between the server and the second wireless device; and
transmit the complete original data stream from the server to the second wireless device via both the third and fourth wireless communication pathways in a manner that enables the second wireless device to receive and reconstruct the complete original data stream via either or both of the third and fourth wireless communication pathways.

86. A server for use within a wireless communication system, comprising:
means for establishing a first wireless communication pathway in the wireless communication system between the server and a first wireless device;
means for establishing, in addition to the first wireless communication pathway, a second wireless communication pathway in the wireless communication system between the server and the first wireless device, wherein the first and second wireless communication pathways are different, and wherein the second wireless communication pathway is initiated at the first wireless device based on a user approving an expenditure of additional resources to establish the second wireless communication pathway following a trigger event associated with multiple different criteria, the multiple different criteria including at least a user input received at the first wireless device indicating that a current call on the wireless communication system is a high priority call in combination with a prediction at the first wireless device that the first wireless device will enter a limited coverage area in the wireless communication system associated with low quality reception via the first wireless communication pathway;
means for receiving a continuous data stream comprising the same original data stream from the first wireless device via both the first and second wireless communication pathways; and
means for reconstructing the complete original data stream from the continuous data stream received via either or both of the first and second wireless communication pathways.

87. The server of claim 86, further comprising:
means for receiving the continuous data stream on both the first and second wireless communication pathways as a series of indexed data packets; and
means for using the series of indexed data packets to recover a more complete set of the data packets than received over either of the first and second wireless communication pathways.

88. The server of claim 86, further comprising:
means for receiving the continuous data stream on both the first and second wireless communication pathways as a series of indexed data packets; and
means for using the series of indexed data packets to discard received redundant packets.

89. The server of claim 86, further comprising:
means for establishing a third wireless communication pathway between the server and a second wireless device;
means for sending a dual communication pathway request from the server to the second wireless device requesting the second wireless device to establish a dual communication pathway with the server;

means for determining whether the dual communication pathway request is accepted or rejected by the second wireless device; and if the dual communication pathway request is accepted by the second wireless device:

means for establishing a fourth wireless communication pathway between the server and the second wireless device; and means for transmitting the complete original data stream from the server to the second wireless device via both the third and fourth wireless communication pathways in a manner that enables the second wireless device to receive and reconstruct the complete original data stream via either or both of the third and fourth wireless communication pathways.

90. A method for maintaining call quality in a wireless communication system, comprising:

establishing a first wireless communication pathway in the wireless communication system between a server and a wireless device;

establishing, in addition to the first wireless communication pathway, a second wireless communication pathway in the wireless communication system between the server and the wireless device, wherein the first and second wireless communication pathways are different, and wherein the second wireless communication pathway is initiated at the wireless device based on a user approving an expenditure of additional resources to establish the second wireless communication pathway following a trigger event associated with multiple different criteria, the multiple different criteria including at least a user input received at the wireless device indicating that a current call on the wireless communication system is a high priority call in combination with a prediction at the wireless device that the wireless device will enter a limited coverage area in the wireless communication system associated with low quality reception via the first wireless communication pathway;

receiving a continuous data stream comprising the same original data stream from the wireless device via both the first and second wireless communication pathways; and reconstructing the complete original data stream from the continuous data stream received via either or both of the first and second wireless communication pathways.

* * * * *